(12) United States Patent
Pett

(10) Patent No.: US 12,551,236 B2
(45) Date of Patent: Feb. 17, 2026

(54) RETRACTABLE INTRAOSSEOUS ACCESS SYSTEM

(71) Applicant: Bard Access Systems, Inc., Salt Lake City, UT (US)

(72) Inventor: Daniel Pett, Sandy, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 918 days.

(21) Appl. No.: 17/463,324

(22) Filed: Aug. 31, 2021

(65) Prior Publication Data

US 2022/0061887 A1 Mar. 3, 2022

Related U.S. Application Data

(60) Provisional application No. 63/073,342, filed on Sep. 1, 2020.

(51) Int. Cl.
*A61B 17/34* (2006.01)
*A61B 17/00* (2006.01)

(52) U.S. Cl.
CPC ...... *A61B 17/3472* (2013.01); *A61B 17/3476* (2013.01); *A61B 17/3494* (2013.01); *A61B 2017/0042* (2013.01); *A61B 2017/00734* (2013.01)

(58) Field of Classification Search
CPC ............ A61B 17/1615; A61B 17/1622; A61B 17/164; A61B 17/2909; A61B 17/3472; A61B 17/3476; A61B 17/3494; A61B 17/8805; A61B 2017/0042; A61B 2017/00734; A61B 2017/291
See application file for complete search history.

(56) References Cited

U.S. PATENT DOCUMENTS

| | | |
|---|---|---|
| 2,773,501 A | 12/1956 | Young |
| 3,071,135 A | 1/1963 | Baldwin et al. |
| 3,261,594 A | 7/1966 | Michel |
| 3,734,207 A | 5/1973 | Fishbein |

(Continued)

FOREIGN PATENT DOCUMENTS

| | | |
|---|---|---|
| CN | 108742795 A | 11/2018 |
| CN | 110547847 A | 12/2019 |

(Continued)

OTHER PUBLICATIONS

EP 19757667.1 filed Sep. 18, 2020 Extended European Search Report dated Oct. 22, 2021.

(Continued)

*Primary Examiner* — Robert A Lynch
(74) *Attorney, Agent, or Firm* — Rutan & Tucker LLP

(57) ABSTRACT

Embodiments disclosed herein are directed to a retractable intraosseous access system configured to transition between an active state and one of a folded state or a retracted state. In the folded state, the access assembly can be pivoted relative to the driver to collapse the access assembly against a handle. In the retracted state, the access assembly is slidably received within a housing of the driver. Advantageously, the retractably intraosseous access system can provide an "all-in-one" design that does not require assembling separate components. Further the retractably intraosseous access system can provide a compact outer profile requiring reduced storage space.

14 Claims, 9 Drawing Sheets

(56) References Cited

U.S. PATENT DOCUMENTS

| | | |
|---|---|---|
| 3,753,432 A | 8/1973 | Guerra |
| 3,804,544 A | 4/1974 | Adams |
| 3,811,442 A | 5/1974 | Maroth |
| 3,815,605 A | 6/1974 | Schmidt et al. |
| 3,991,765 A | 11/1976 | Cohen |
| 4,266,555 A | 5/1981 | Jamshidi |
| 4,314,565 A | 2/1982 | Lee |
| 4,342,724 A | 8/1982 | Narra |
| 4,381,777 A | 5/1983 | Garnier |
| 4,383,530 A | 5/1983 | Bruno |
| 4,562,844 A | 1/1986 | Carpenter et al. |
| 4,736,742 A | 4/1988 | Alexson et al. |
| 4,787,893 A | 11/1988 | Villette |
| 4,889,529 A | 12/1989 | Haindl |
| 4,952,207 A | 8/1990 | Lemieux |
| 4,964,854 A | 10/1990 | Luther |
| 4,969,870 A | 11/1990 | Kramer et al. |
| 5,040,542 A | 8/1991 | Gray |
| 5,042,558 A | 8/1991 | Hussey et al. |
| 5,053,017 A | 10/1991 | Chamuel |
| 5,122,114 A | 6/1992 | Miller et al. |
| 5,207,697 A | 5/1993 | Carusillo et al. |
| 5,263,939 A | 11/1993 | Wortrich |
| 5,290,267 A | 3/1994 | Zimmermann |
| 5,312,364 A | 5/1994 | Jacobs |
| 5,332,398 A | 7/1994 | Miller et al. |
| 5,364,367 A | 11/1994 | Banks et al. |
| 5,372,583 A | 12/1994 | Roberts et al. |
| 5,384,103 A * | 1/1995 | Miller ................. A61L 2/26 |
| | | 206/508 |
| 5,406,940 A | 4/1995 | Melzer et al. |
| 5,451,210 A | 9/1995 | Kramer et al. |
| 5,554,154 A | 9/1996 | Rosenberg |
| 5,573,358 A * | 11/1996 | Gobbers ............... B23B 45/003 |
| | | 408/239 R |
| 5,575,780 A | 11/1996 | Saito |
| 5,591,188 A | 1/1997 | Waisman |
| 5,601,559 A | 2/1997 | Melker et al. |
| 5,667,509 A | 9/1997 | Westin |
| 5,688,249 A | 11/1997 | Chang et al. |
| 5,694,019 A | 12/1997 | Uchida et al. |
| 5,779,708 A | 7/1998 | Wu |
| 5,817,052 A | 10/1998 | Johnson et al. |
| 5,853,393 A | 12/1998 | Bogert |
| 5,868,711 A | 2/1999 | Kramer et al. |
| 5,885,293 A | 3/1999 | McDevitt |
| 5,927,976 A | 7/1999 | Wu |
| 5,960,797 A | 10/1999 | Kramer et al. |
| 5,967,143 A | 10/1999 | Klappenberger |
| 6,018,227 A | 1/2000 | Kumar et al. |
| 6,056,165 A | 5/2000 | Speranza |
| 6,104,162 A | 8/2000 | Sainsbury et al. |
| 6,117,108 A | 9/2000 | Woehr et al. |
| 6,135,769 A | 10/2000 | Kwan |
| 6,159,161 A | 12/2000 | Hodosh |
| 6,199,664 B1 | 3/2001 | Tkaczyk et al. |
| 6,210,373 B1 | 4/2001 | Allmon |
| 6,228,088 B1 | 5/2001 | Miller et al. |
| 6,247,928 B1 | 6/2001 | Meller et al. |
| 6,270,484 B1 | 8/2001 | Yoon |
| 6,273,715 B1 | 8/2001 | Meller et al. |
| 6,419,490 B1 | 7/2002 | Kitchings Weathers, Jr. |
| 6,458,117 B1 | 10/2002 | Pollins, Sr. |
| 6,527,778 B2 | 3/2003 | Athanasiou et al. |
| 6,547,561 B2 | 4/2003 | Meller et al. |
| 6,602,214 B2 | 8/2003 | Heinz et al. |
| 6,626,887 B1 | 9/2003 | Wu |
| 6,629,959 B2 | 10/2003 | Kuracina et al. |
| 6,641,395 B2 | 11/2003 | Kumar et al. |
| 6,652,490 B2 | 11/2003 | Howell |
| 6,692,471 B2 | 2/2004 | Boudreaux |
| 6,715,969 B2 * | 4/2004 | Eriksen ................. B23B 45/003 |
| | | 408/239 R |
| 6,761,726 B1 | 7/2004 | Findlay et al. |
| 6,814,734 B2 | 11/2004 | Chappuis et al. |
| 6,830,562 B2 | 12/2004 | Mogensen et al. |
| 6,875,219 B2 | 4/2005 | Arramon et al. |
| 6,905,486 B2 | 6/2005 | Gibbs |
| 6,916,292 B2 | 7/2005 | Morawski et al. |
| 6,984,213 B2 | 1/2006 | Horner et al. |
| 6,997,907 B2 | 2/2006 | Safabash et al. |
| 7,112,191 B2 | 9/2006 | Daga |
| 7,135,031 B2 | 11/2006 | Flint |
| 7,214,208 B2 | 5/2007 | Vaillancourt et al. |
| 7,347,838 B2 | 3/2008 | Kulli |
| 7,347,840 B2 | 3/2008 | Findlay et al. |
| 7,407,493 B2 | 8/2008 | Cane' |
| 7,458,954 B2 | 12/2008 | Ferguson et al. |
| 7,513,888 B2 | 4/2009 | Sircom et al. |
| 7,530,965 B2 | 5/2009 | Villa et al. |
| 7,534,227 B2 | 5/2009 | Kulli |
| 7,569,033 B2 | 8/2009 | Greene et al. |
| 7,582,102 B2 | 9/2009 | Heinz et al. |
| 7,588,559 B2 | 9/2009 | Aravena et al. |
| 7,658,725 B2 | 2/2010 | Bialecki et al. |
| 7,670,328 B2 | 3/2010 | Miller |
| 7,699,807 B2 | 4/2010 | Faust et al. |
| 7,699,850 B2 | 4/2010 | Miller |
| 7,736,332 B2 | 6/2010 | Carlyon et al. |
| 7,749,225 B2 | 7/2010 | Chappuis et al. |
| 7,798,994 B2 | 9/2010 | Brimhall |
| 7,811,260 B2 | 10/2010 | Miller et al. |
| 7,815,642 B2 | 10/2010 | Miller |
| 7,828,774 B2 | 11/2010 | Harding et al. |
| 7,833,204 B2 | 11/2010 | Picha |
| 7,842,038 B2 | 11/2010 | Haddock et al. |
| 7,850,620 B2 | 12/2010 | Miller et al. |
| 7,850,650 B2 | 12/2010 | Breitweiser |
| D633,199 S | 2/2011 | MacKay et al. |
| 7,899,528 B2 | 3/2011 | Miller et al. |
| 7,905,857 B2 | 3/2011 | Swisher |
| 7,951,089 B2 | 5/2011 | Miller |
| 7,955,297 B2 | 6/2011 | Radmer et al. |
| 7,972,339 B2 | 7/2011 | Nassiri et al. |
| 7,976,502 B2 | 7/2011 | Baid |
| 8,038,038 B2 | 10/2011 | Hillhouse et al. |
| 8,038,664 B2 | 10/2011 | Miller et al. |
| 8,043,253 B2 | 10/2011 | Kraft et al. |
| 8,043,265 B2 | 10/2011 | Abe et al. |
| 8,142,365 B2 | 3/2012 | Miller |
| 8,152,771 B2 | 4/2012 | Mogensen et al. |
| 8,162,904 B2 | 4/2012 | Takano et al. |
| 8,167,899 B2 | 5/2012 | Justis et al. |
| 8,221,398 B2 | 7/2012 | Isobe et al. |
| 8,235,945 B2 | 8/2012 | Baid |
| 8,246,584 B2 | 8/2012 | Aravena et al. |
| 8,273,053 B2 | 9/2012 | Saltzstein |
| 8,292,891 B2 | 10/2012 | Browne et al. |
| 8,308,693 B2 | 11/2012 | Miller et al. |
| 8,333,769 B2 | 12/2012 | Browne et al. |
| 8,356,598 B2 | 1/2013 | Rumsey |
| 8,357,163 B2 | 1/2013 | Sidebotham et al. |
| 8,388,541 B2 | 3/2013 | Messerly et al. |
| 8,388,623 B2 | 3/2013 | Browne et al. |
| 8,414,539 B1 | 4/2013 | Kuracina et al. |
| 8,419,683 B2 | 4/2013 | Miller et al. |
| 8,480,632 B2 | 7/2013 | Miller et al. |
| 8,480,672 B2 | 7/2013 | Browne et al. |
| 8,486,027 B2 | 7/2013 | Findlay et al. |
| 8,506,568 B2 | 8/2013 | Miller |
| 8,535,271 B2 | 9/2013 | Fuchs et al. |
| 8,562,615 B2 | 10/2013 | Browne et al. |
| 8,615,286 B2 | 12/2013 | Shen et al. |
| 8,641,715 B2 | 2/2014 | Miller |
| 8,647,257 B2 | 2/2014 | Jansen et al. |
| 8,656,929 B2 | 2/2014 | Miller et al. |
| 8,657,790 B2 | 2/2014 | Tal et al. |
| 8,663,231 B2 | 3/2014 | Browne et al. |
| 8,668,698 B2 | 3/2014 | Miller et al. |
| 8,684,978 B2 | 4/2014 | Miller et al. |
| 8,690,791 B2 | 4/2014 | Miller |
| 8,715,287 B2 | 5/2014 | Miller |
| 8,771,230 B2 | 7/2014 | White et al. |
| 8,781,555 B2 | 7/2014 | Burnside et al. |

(56) References Cited

U.S. PATENT DOCUMENTS

| | | |
|---|---|---|
| 8,801,663 B2 | 8/2014 | Woehr |
| 8,812,101 B2 | 8/2014 | Miller et al. |
| 8,814,835 B2 | 8/2014 | Baid |
| 8,821,493 B2 | 9/2014 | Anderson |
| 8,828,001 B2 | 9/2014 | Stearns et al. |
| 8,849,382 B2 | 9/2014 | Cox et al. |
| 8,870,872 B2 | 10/2014 | Miller |
| 8,894,654 B2 | 11/2014 | Anderson |
| 8,936,575 B2 | 1/2015 | Moulton |
| 8,944,069 B2 | 2/2015 | Miller et al. |
| 8,974,410 B2 | 3/2015 | Miller et al. |
| 8,998,848 B2 | 4/2015 | Miller et al. |
| 9,072,543 B2 | 7/2015 | Miller et al. |
| 9,078,637 B2 | 7/2015 | Miller |
| 9,149,625 B2 | 10/2015 | Woehr et al. |
| 9,161,798 B2 | 10/2015 | Truckai et al. |
| 9,173,679 B2 | 11/2015 | Tzachar et al. |
| 9,226,756 B2 | 1/2016 | Teisen et al. |
| 9,278,195 B2 | 3/2016 | Erskine |
| 9,295,487 B2 | 3/2016 | Miller et al. |
| 9,302,077 B2 | 4/2016 | Domonkos et al. |
| 9,314,232 B2 | 4/2016 | Stark |
| 9,314,270 B2 | 4/2016 | Miller |
| 9,358,348 B2 | 6/2016 | Weilbacher et al. |
| 9,393,031 B2 | 7/2016 | Miller |
| 9,414,815 B2 | 8/2016 | Miller et al. |
| 9,415,192 B2 | 8/2016 | Kuracina et al. |
| 9,421,345 B2 | 8/2016 | Woehr et al. |
| 9,427,555 B2 | 8/2016 | Baid |
| 9,433,400 B2 | 9/2016 | Miller |
| 9,439,667 B2 | 9/2016 | Miller |
| 9,439,702 B2 | 9/2016 | Arthur et al. |
| 9,445,743 B2 | 9/2016 | Kassab |
| 9,451,968 B2 | 9/2016 | Miller et al. |
| 9,451,983 B2 | 9/2016 | Windolf |
| 9,456,766 B2 | 10/2016 | Cox et al. |
| 9,480,483 B2 | 11/2016 | Browne et al. |
| 9,492,097 B2 | 11/2016 | Wilkes et al. |
| 9,504,477 B2 | 11/2016 | Miller et al. |
| 9,521,961 B2 | 12/2016 | Silverstein et al. |
| 9,545,243 B2 | 1/2017 | Miller et al. |
| 9,554,716 B2 | 1/2017 | Burnside et al. |
| 9,615,816 B2 | 4/2017 | Woodard |
| 9,615,838 B2 | 4/2017 | Nino et al. |
| 9,623,210 B2 | 4/2017 | Woehr |
| 9,636,031 B2 | 5/2017 | Cox |
| 9,636,484 B2 | 5/2017 | Baid |
| 9,649,048 B2 | 5/2017 | Cox et al. |
| 9,681,889 B1 | 6/2017 | Greenhalgh et al. |
| 9,687,633 B2 | 6/2017 | Teoh |
| 9,717,564 B2 | 8/2017 | Miller et al. |
| 9,730,729 B2 | 8/2017 | Kilcoin et al. |
| 9,782,546 B2 | 10/2017 | Woehr |
| 9,839,740 B2 | 12/2017 | Beamer et al. |
| 9,844,646 B2 | 12/2017 | Knutsson |
| 9,844,647 B2 | 12/2017 | Knutsson |
| 9,872,703 B2 | 1/2018 | Miller et al. |
| 9,883,853 B2 | 2/2018 | Woodard et al. |
| 9,895,512 B2 | 2/2018 | Kraft et al. |
| 9,962,211 B2 | 5/2018 | Csernatoni |
| 10,052,111 B2 | 8/2018 | Miller et al. |
| 10,092,320 B2 | 10/2018 | Morgan et al. |
| 10,092,706 B2 | 10/2018 | Denzer et al. |
| 10,159,531 B2 | 12/2018 | Misener et al. |
| 10,172,538 B2 | 1/2019 | Kassab |
| 10,413,211 B2 | 9/2019 | Kassab |
| 10,426,940 B2 | 10/2019 | Aklog et al. |
| 10,449,330 B2 | 10/2019 | Newman et al. |
| D898,908 S | 10/2020 | Denzer et al. |
| 10,893,887 B2 | 1/2021 | Blanchard |
| 10,973,532 B2 | 4/2021 | Miller et al. |
| 10,973,545 B2 | 4/2021 | Miller et al. |
| 10,980,522 B2 | 4/2021 | Muse |
| 11,298,202 B2 | 4/2022 | Miller et al. |
| 11,446,112 B2 | 9/2022 | Fink et al. |
| 11,896,264 B2 | 2/2024 | Lindekugel et al. |
| 11,925,361 B2 | 3/2024 | Pett et al. |
| 11,998,237 B2 | 6/2024 | Lindekugel et al. |
| 12,274,469 B2 | 4/2025 | Pett |
| 2003/0060781 A1 | 3/2003 | Mogensen et al. |
| 2003/0225344 A1 | 12/2003 | Miller |
| 2003/0225411 A1 | 12/2003 | Miller |
| 2003/0229308 A1 | 12/2003 | Tsals et al. |
| 2004/0010236 A1 | 1/2004 | Morawski et al. |
| 2004/0059317 A1 | 3/2004 | Hermann |
| 2004/0220497 A1 | 11/2004 | Findlay et al. |
| 2004/0243135 A1 | 12/2004 | Koseki |
| 2005/0035014 A1 | 2/2005 | Cane |
| 2005/0101912 A1 | 5/2005 | Faust et al. |
| 2005/0113866 A1 | 5/2005 | Heinz et al. |
| 2005/0131345 A1 | 6/2005 | Miller |
| 2005/0165403 A1 | 7/2005 | Miller |
| 2006/0015066 A1 | 1/2006 | Turieo et al. |
| 2006/0020191 A1 | 1/2006 | Brister et al. |
| 2006/0025723 A1 | 2/2006 | Ballarini |
| 2006/0058826 A1 | 3/2006 | Evans et al. |
| 2006/0147283 A1* | 7/2006 | Phillips ............ B25F 3/00 408/35 |
| 2007/0049945 A1 | 3/2007 | Miller |
| 2007/0096690 A1 | 5/2007 | Casalena et al. |
| 2007/0098507 A1* | 5/2007 | Whitehead ........ B25F 3/00 408/35 |
| 2007/0151116 A1 | 7/2007 | Malandain |
| 2007/0191772 A1 | 8/2007 | Wojcik |
| 2007/0270775 A1 | 11/2007 | Miller et al. |
| 2007/0276352 A1 | 11/2007 | Crocker et al. |
| 2007/0282344 A1 | 12/2007 | Yedlicka et al. |
| 2008/0015467 A1 | 1/2008 | Miller |
| 2008/0154304 A1 | 6/2008 | Crawford et al. |
| 2008/0208136 A1 | 8/2008 | Findlay et al. |
| 2008/0215056 A1 | 9/2008 | Miller et al. |
| 2008/0221580 A1 | 9/2008 | Miller et al. |
| 2008/0257359 A1 | 10/2008 | Rumsey |
| 2009/0000292 A1 | 1/2009 | Schifferer et al. |
| 2009/0022557 A1* | 1/2009 | Whitehead ........ B25F 3/00 408/35 |
| 2009/0048575 A1 | 2/2009 | Waters |
| 2009/0054808 A1 | 2/2009 | Miller |
| 2009/0093830 A1 | 4/2009 | Miller |
| 2009/0194446 A1 | 8/2009 | Miller et al. |
| 2009/0204024 A1 | 8/2009 | Miller |
| 2009/0306697 A1 | 12/2009 | Fischvogt |
| 2010/0004606 A1 | 1/2010 | Hansen et al. |
| 2010/0174243 A1 | 7/2010 | McKay |
| 2010/0202842 A1* | 8/2010 | Whitehead ........ B25F 3/00 408/139 |
| 2010/0204649 A1 | 8/2010 | Miller et al. |
| 2010/0286607 A1 | 11/2010 | Saltzstein |
| 2010/0298830 A1 | 11/2010 | Browne et al. |
| 2010/0298831 A1 | 11/2010 | Browne et al. |
| 2010/0312246 A1 | 12/2010 | Browne et al. |
| 2011/0004163 A1 | 1/2011 | Vaidya |
| 2011/0028976 A1 | 2/2011 | Miller |
| 2011/0202065 A1 | 8/2011 | Takizawa et al. |
| 2012/0116390 A1* | 5/2012 | Madan ............ A61B 50/30 606/41 |
| 2012/0116394 A1* | 5/2012 | Timm ............ G16H 20/40 606/41 |
| 2012/0202180 A1 | 8/2012 | Stock et al. |
| 2012/0203154 A1 | 8/2012 | Tzachar |
| 2012/0274280 A1 | 11/2012 | Yip et al. |
| 2013/0030439 A1 | 1/2013 | Browne et al. |
| 2013/0041345 A1 | 2/2013 | Kilcoin et al. |
| 2013/0072938 A1 | 3/2013 | Browne et al. |
| 2013/0102924 A1 | 4/2013 | Findlay et al. |
| 2013/0158484 A1 | 6/2013 | Browne et al. |
| 2013/0178807 A1 | 7/2013 | Baid |
| 2014/0031674 A1 | 1/2014 | Newman et al. |
| 2014/0031794 A1 | 1/2014 | Windolf |
| 2014/0039400 A1 | 2/2014 | Browne et al. |
| 2014/0081281 A1 | 3/2014 | Felder |
| 2014/0142577 A1 | 5/2014 | Miller |
| 2014/0171873 A1 | 6/2014 | Mark |
| 2014/0188133 A1 | 7/2014 | Misener |

(56) References Cited

U.S. PATENT DOCUMENTS

| | | |
|---|---|---|
| 2014/0221970 A1 | 8/2014 | Eaton et al. |
| 2014/0262408 A1 | 9/2014 | Woodard |
| 2014/0262880 A1 | 9/2014 | Yoon |
| 2014/0276205 A1 | 9/2014 | Miller et al. |
| 2014/0276206 A1 | 9/2014 | Woodward et al. |
| 2014/0276471 A1 | 9/2014 | Emery et al. |
| 2014/0276833 A1 | 9/2014 | Larsen et al. |
| 2014/0276839 A1 | 9/2014 | Forman et al. |
| 2014/0343454 A1 | 11/2014 | Miller et al. |
| 2014/0343497 A1 | 11/2014 | Baid |
| 2015/0011941 A1 | 1/2015 | Saeki |
| 2015/0025311 A1 | 1/2015 | Kadan et al. |
| 2015/0045732 A1 | 2/2015 | Murphy et al. |
| 2015/0080762 A1 | 3/2015 | Kassab et al. |
| 2015/0126931 A1 | 5/2015 | Holm et al. |
| 2015/0196737 A1 | 7/2015 | Baid |
| 2015/0223786 A1 | 8/2015 | Morgan et al. |
| 2015/0230823 A1 | 8/2015 | Morgan et al. |
| 2015/0238733 A1 | 8/2015 | bin Abdulla |
| 2015/0342615 A1 | 12/2015 | Keinan et al. |
| 2015/0342756 A1 | 12/2015 | Bays et al. |
| 2015/0351797 A1 | 12/2015 | Miller et al. |
| 2015/0366569 A1 | 12/2015 | Miller |
| 2015/0367487 A1 | 12/2015 | Nino et al. |
| 2016/0009812 A1 | 1/2016 | Satelli et al. |
| 2016/0022282 A1 | 1/2016 | Miller et al. |
| 2016/0022284 A1 | 1/2016 | Lele et al. |
| 2016/0039916 A1 | 2/2016 | Jiang et al. |
| 2016/0058432 A1 | 3/2016 | Miller |
| 2016/0066954 A1 | 3/2016 | Miller et al. |
| 2016/0136410 A1 | 5/2016 | Aklog et al. |
| 2016/0183974 A1 | 6/2016 | Miller |
| 2016/0184509 A1 | 6/2016 | Miller et al. |
| 2016/0235949 A1 | 8/2016 | Baid |
| 2016/0305497 A1 | 10/2016 | Victor et al. |
| 2016/0354539 A1 | 12/2016 | Tan et al. |
| 2016/0361519 A1 | 12/2016 | Teoh et al. |
| 2017/0020533 A1 | 1/2017 | Browne et al. |
| 2017/0020560 A1 | 1/2017 | Van Citters et al. |
| 2017/0021138 A1 | 1/2017 | Sokolski |
| 2017/0043135 A1 | 2/2017 | Knutsson |
| 2017/0105763 A1 | 4/2017 | Karve et al. |
| 2017/0136217 A1 | 5/2017 | Riesenberger et al. |
| 2017/0151419 A1 | 6/2017 | Sonksen |
| 2017/0156740 A9 | 6/2017 | Stark |
| 2017/0156751 A1 | 6/2017 | Csernatoni |
| 2017/0209129 A1 | 7/2017 | Fagundes et al. |
| 2017/0231644 A1 | 8/2017 | Anderson |
| 2017/0303962 A1 | 10/2017 | Browne et al. |
| 2017/0303963 A1 | 10/2017 | Kilcoin et al. |
| 2018/0049772 A1 | 2/2018 | Brockman et al. |
| 2018/0092662 A1 | 4/2018 | Rioux et al. |
| 2018/0116551 A1 | 5/2018 | Newman et al. |
| 2018/0116642 A1 | 5/2018 | Woodard et al. |
| 2018/0116693 A1 | 5/2018 | Blanchard et al. |
| 2018/0117262 A1 | 5/2018 | Islam |
| 2018/0125465 A1* | 5/2018 | Muse ............... A61B 17/3472 |
| 2018/0153474 A1 | 6/2018 | Aeschlimann et al. |
| 2018/0154112 A1 | 6/2018 | Chan et al. |
| 2018/0221003 A1 | 8/2018 | Hibner et al. |
| 2018/0228509 A1 | 8/2018 | Fojtik |
| 2018/0242982 A1 | 8/2018 | Laughlin et al. |
| 2019/0009398 A1* | 1/2019 | Zhong ..................... B23B 45/02 |
| 2019/0030701 A1* | 1/2019 | Duggan ............... B25D 16/006 |
| 2019/0059986 A1 | 2/2019 | Shelton, IV et al. |
| 2019/0069812 A1 | 3/2019 | Saacson et al. |
| 2019/0083753 A1 | 3/2019 | Chu |
| 2019/0150954 A1 | 5/2019 | Xie |
| 2019/0175220 A1 | 6/2019 | Coppedge et al. |
| 2019/0282244 A1 | 9/2019 | Muse |
| 2019/0314059 A1 | 10/2019 | Coppedge et al. |
| 2020/0054347 A1* | 2/2020 | Coppedge ......... A61B 17/1628 |
| 2020/0054410 A1 | 2/2020 | Pfotenhauer et al. |
| 2020/0113584 A1 | 4/2020 | McGinley et al. |
| 2020/0129186 A1 | 4/2020 | Miller et al. |
| 2020/0197121 A1 | 6/2020 | Morey et al. |
| 2020/0297382 A1 | 9/2020 | Coppedge et al. |
| 2020/0297452 A1 | 9/2020 | Coppedge et al. |
| 2020/0337782 A1 | 10/2020 | Glassman et al. |
| 2021/0015529 A1 | 1/2021 | Fenton, Jr. et al. |
| 2021/0093357 A1 | 4/2021 | Pett et al. |
| 2021/0093358 A1 | 4/2021 | Lindekugel et al. |
| 2021/0113251 A1 | 4/2021 | Vogt et al. |
| 2021/0282812 A1 | 9/2021 | Tierney et al. |
| 2021/0322055 A1 | 10/2021 | Lindekugel et al. |
| 2021/0375445 A1 | 12/2021 | Lindekugel et al. |
| 2021/0393337 A1 | 12/2021 | Zucker |
| 2022/0240976 A1 | 8/2022 | Pett et al. |
| 2022/0249104 A1 | 8/2022 | Pett et al. |
| 2022/0273338 A1 | 9/2022 | Eisenthal et al. |
| 2023/0106545 A1 | 4/2023 | Pett et al. |
| 2023/0285049 A1 | 9/2023 | Howell |
| 2023/0414251 A1 | 12/2023 | Pett et al. |
| 2024/0058036 A1 | 2/2024 | Lindekugel et al. |
| 2024/0206887 A1 | 6/2024 | Pett et al. |
| 2024/0261554 A1 | 8/2024 | Akerele-Ale et al. |
| 2024/0277375 A1 | 8/2024 | Lindekugel et al. |
| 2025/0120743 A1 | 4/2025 | Pett et al. |
| 2025/0186085 A1 | 6/2025 | Pett et al. |
| 2025/0235238 A1 | 7/2025 | Pett |

FOREIGN PATENT DOCUMENTS

| | | |
|---|---|---|
| EP | 0923961 A1 | 6/1999 |
| EP | 3687024 A1 | 7/2020 |
| ES | 2390297 A1 | 11/2012 |
| FR | 2581548 A1 | 11/1986 |
| JP | 2018509969 A | 4/2018 |
| KR | 20090006621 A | 1/2009 |
| WO | 1997024151 A1 | 7/1997 |
| WO | 1998052638 A3 | 2/1999 |
| WO | 2005/046769 A2 | 5/2005 |
| WO | 05041790 A2 | 5/2005 |
| WO | 2005053506 A2 | 6/2005 |
| WO | 2005072625 A2 | 8/2005 |
| WO | 2007018809 A2 | 2/2007 |
| WO | 2008002961 A2 | 1/2008 |
| WO | 2008016757 A2 | 2/2008 |
| WO | 2008033871 A2 | 3/2008 |
| WO | 2008033872 A2 | 3/2008 |
| WO | 2008033873 A2 | 3/2008 |
| WO | 2008033874 A2 | 3/2008 |
| WO | 2008054894 A2 | 5/2008 |
| WO | 2008086258 A1 | 7/2008 |
| WO | 2008124206 A2 | 10/2008 |
| WO | 2008124463 A2 | 10/2008 |
| WO | 2008130893 A1 | 10/2008 |
| WO | 2008134355 A2 | 11/2008 |
| WO | 2008144379 A2 | 11/2008 |
| WO | 2009070896 A1 | 6/2009 |
| WO | 2010043043 A2 | 4/2010 |
| WO | 2011070593 A1 | 6/2011 |
| WO | 2011097311 A2 | 8/2011 |
| WO | 2011139294 A1 | 11/2011 |
| WO | 2013003885 A1 | 1/2013 |
| WO | 2013009901 A2 | 1/2013 |
| WO | 2013173360 A1 | 11/2013 |
| WO | 2014075165 A1 | 5/2014 |
| WO | 2014142948 A1 | 9/2014 |
| WO | 2014144239 A1 | 9/2014 |
| WO | 2014144262 A1 | 9/2014 |
| WO | 2014144489 A2 | 9/2014 |
| WO | 2014144757 A1 | 9/2014 |
| WO | 2014144797 A1 | 9/2014 |
| WO | 2015061370 A1 | 4/2015 |
| WO | 2015/177612 A1 | 11/2015 |
| WO | 2016033016 A1 | 3/2016 |
| WO | 16053834 A1 | 4/2016 |
| WO | 2016/085973 A1 | 6/2016 |
| WO | 2016163939 A1 | 10/2016 |
| WO | 18006045 A1 | 1/2018 |
| WO | 2018025094 A1 | 2/2018 |
| WO | 2018058036 A1 | 3/2018 |
| WO | 2018075694 A1 | 4/2018 |

(56) References Cited

FOREIGN PATENT DOCUMENTS

| WO | 18098086 A1 | 5/2018 |
| WO | 2018165334 A1 | 9/2018 |
| WO | 2018165339 A1 | 9/2018 |
| WO | 2019051343 A1 | 3/2019 |
| WO | 2019/164990 A1 | 8/2019 |
| WO | 2021/011795 A1 | 1/2021 |
| WO | 2021/016122 A1 | 1/2021 |
| WO | 2021/062385 A1 | 4/2021 |
| WO | 2021062038 A1 | 4/2021 |
| WO | 2021062394 A1 | 4/2021 |
| WO | 2022/165232 A1 | 8/2022 |
| WO | 2022/170269 A1 | 8/2022 |
| WO | 2023177634 A1 | 9/2023 |
| WO | 2024/163884 A1 | 8/2024 |

OTHER PUBLICATIONS

EP 20867024.0 filed Apr. 21, 2022 Extended European Search Report dated Aug. 8, 2023.
EP 20868351.6 filed Apr. 21, 2022 Extended European Search Report dated Aug. 10, 2023.
EP 23166984.7 filed Apr. 6, 2023 Extended European Search Report dated Jul. 5, 2023.
PCT/US2023/015127 filed Mar. 13, 2023 International Search Report and Written Opinion dated Jun. 26, 2023.
U.S. Appl. No. 17/035,272, filed Sep. 28, 2020 Notice of Allowance dated Jul. 7, 2023.
U.S. Appl. No. 17/235,134, filed Apr. 20, 2021 Non-Final Office Action dated Jun. 27, 2023.
U.S. Appl. No. 17/335,870, filed Jun. 1, 2021 Restriction Requirement dated Jul. 25, 2023.
U.S. Appl. No. 17/667,291, filed Feb. 8, 2022 Non-Final Office Action dated Aug. 31, 2023.
Ekchian Gregory James et al: "Quantitative Methods for In Vitro and In Vivo Characterization of Cell and Tissue Metabolism", Jun. 11, 2018, XP055839281, retrieved from the internet on Sep. 8, 2021 : URL: https://dspace.mit.edu/bitstream/handle/1721.1/117890/1051211749-MIT.pdf?sequence=1&isAllowed=y.
PCT/US2019/ 018828 filed Feb. 20, 2019 International Preliminary Report on Patentability dated Aug. 27, 2020.
PCT/US2019/ 018828 filed Feb. 20, 2019 International Search Report and Written Opinion dated Jun. 13, 2019.
PCT/US2020/ 053119 filed Sep. 28, 2020 International Search Report and Written Opinion dated Jan. 5, 2021.
PCT/US2020/052558 filed Sep. 24, 2020 International Search Report and Written Opinion dated Feb. 11, 2021.
PCT/US2020/053135 filed Sep. 28, 2020 International Search Report and Written Opinion dated Dec. 18, 2020.
PCT/US2021/ 035232 filed Jun. 1, 2021 International Search Report and Written Opinion dated Oct. 19, 2021.
PCT/US2021/028114 filed Apr. 20, 2021 International Search Report and Written Opinion dated Jul. 12, 2021.
PCT/US2021/035475 filed Jun. 2, 2021 International Search Report and Written Opinion dated Sep. 17, 2021.
U.S. Appl. No. 17/335,870, filed Jun. 1, 2021 Final Office Action dated Mar. 26, 2024.
U.S. Appl. No. 17/337,100, filed Jun. 2, 2021 Notice of Allowance dated Jan. 24, 2024.
U.S. Appl. No. 17/469,613, filed Sep. 8, 2021 Non-Final Office Action dated Jan. 19, 2024.
U.S. Appl. No. 17/035,272, filed Sep. 28, 2020 Non-Final Office Action dated Mar. 9, 2023.
U.S. Appl. No. 17/035,272, filed Sep. 28, 2020 Restriction Requirement dated Dec. 9, 2022.
U.S. Appl. No. 17/035,336, filed Sep. 28, 2020 Notice of Allowance dated Jan. 11, 2023.
U.S. Appl. No. 17/235,134, filed Apr. 20, 2021 Restriction Requirement dated Mar. 7, 2023.
U.S. Appl. No. 17/337,100, filed Jun. 2, 2021 Non-Final Office Action dated Jun. 2, 2023.
U.S. Appl. No. 17/667,291, filed Feb. 8, 2022 Restriction Requirement dated May 31, 2023.
PCT/US2024/014241 filed Feb. 2, 2024 International Search Report and Written Opinion dated May 8, 2024.
U.S. Appl. No. 17/405,692, filed Aug. 18, 2021 Non-Final Office Action dated Sep. 6, 2024.
U.S. Appl. No. 17/405,692, filed Aug. 18, 2021 Restriction Requirement dated May 10, 2024.
U.S. Appl. No. 17/410,863, filed Aug. 24, 2021 Non-Final Office Action dated Sep. 5, 2024.
U.S. Appl. No. 18/075,269, filed Dec. 5, 2022 Non-Final Office Action dated Jun. 24, 2024.
U.S. Appl. No. 18/075,269, filed Dec. 5, 2022 Notice of Allowance dated Sep. 11, 2024.
U.S. Appl. No. 18/244,730, filed Sep. 11, 2023 Final Office Action dated Aug. 8, 2024.
U.S. Appl. No. 18/244,730, filed Sep. 11, 2023 Non-Final Office Action dated May 3, 2024.
U.S. Appl. No. 18/385,056, filed Oct. 30, 2023 Non-Final Office Action dated May 9, 2024.
U.S. Appl. No. 18/385,056, filed Oct. 30, 2023 Notice of Allowance dated Aug. 29, 2024.
PCT/US2022/014391 filed Jan. 28, 2022 International Search Report and Written Opinion dated Apr. 14, 2022.
PCT/US2022/015686 filed Feb. 8, 2022 International Search Report and Written Opinion dated May 25, 2022.
U.S. Appl. No. 17/031,650, filed Sep. 24, 2020 Final Office Action dated Jul. 20, 2022.
U.S. Appl. No. 17/031,650, filed Sep. 24, 2020 Notice of Allowance dated Oct. 12, 2022.
U.S. Appl. No. 17/035,336, filed Sep. 28, 2020 Restriction Requirement dated Jul. 26, 2022.
U.S. Appl. No. 17/235,134, filed Apr. 20, 2021 Notice of Allowance dated Sep. 20, 2023.
U.S. Appl. No. 17/335,870, filed Jun. 1, 2021 Non-Final Office Action dated Nov. 15, 2023.
U.S. Appl. No. 17/337,100, filed Jun. 2, 2021 Final Office Action dated Nov. 21, 2023.
U.S. Appl. No. 17/469,613, filed Sep. 8, 2021 Restriction Requirement dated Oct. 23, 2023.
U.S. Appl. No. 17/863,898, filed Jul. 13, 2022 Final Office Action dated Nov. 22, 2023.
PCT/US2021/ 046573 filed Aug. 18, 2021 International Search Report and Written Opinion dated Nov. 30, 2021.
PCT/US2021/ 047378 filed Aug. 24, 2021 International Search Report and Written Opinion dated Nov. 17, 2021.
PCT/US2021/ 048542 filed Aug. 31, 2021 International Search Report and Written Opinion dated Dec. 9, 2021.
PCT/US2021/ 049475 filed Sep. 8, 2021 International Search Report and Written Opinion dated Dec. 9, 2021.
U.S. Appl. No. 17/031,650, filed Sep. 24, 2020 Non-Final Office Action dated Jan. 19, 2022.
U.S. Appl. No. 17/405,692, filed Aug. 18, 2021 Final Office Action dated Dec. 4, 2024.
U.S. Appl. No. 17/410,863, filed Aug. 24, 2021 Notice of Allowance dated Dec. 13, 2024.
U.S. Appl. No. 17/469,613, filed Sep. 8, 2021 Final Office Action dated Dec. 6, 2024.
U.S. Appl. No. 17/587,900, filed Jan. 28, 2022 Non-Final Office Action dated Nov. 14, 2024.
U.S. Appl. No. 18/244,730, filed Sep. 11, 2023 Notice of Allowance dated Oct. 24, 2024.
U.S. Appl. No. 18/599,077, filed Mar. 7, 2024 Non-Final Office Action dated Feb. 3, 2025.
U.S. Appl. No. 17/405,692, filed Aug. 18, 2021 Advisory Action dated Feb. 14, 2025.
U.S. Appl. No. 17/405,692, filed Aug. 18, 2021 Non-Final Office Action dated Apr. 10, 2025.
U.S. Appl. No. 17/469,613, filed Sep. 8, 2021 Advisory Action dated Mar. 21, 2025.

(56) References Cited

OTHER PUBLICATIONS

U.S. Appl. No. 17/587,900, filed Jan. 28, 2022 Final Office Action dated Apr. 17, 2025.
U.S. Appl. No. 18/599,077, filed Mar. 7, 2024 Notice of Allowance dated Apr. 16, 2025.
U.S. Appl. No. 18/653,641, filed May 2, 2024 Non-Final Office Action dated Apr. 5, 2025.
U.S. Appl. No. 17/469,613, filed Sep. 8, 2021 Notice of Allowance dated May 14, 2025.
U.S. Appl. No. 17/587,900, filed Jan. 28, 2022 Advisory Action dated Jul. 29, 2025.
U.S. Appl. No. 17/405,692, filed Aug. 18, 2021 Final Office Action dated Sep. 12, 2025.
U.S. Appl. No. 17/587,900, filed Jan. 28, 2022 Non-Final Office Action dated Sep. 30, 2025.
U.S. Appl. No. 18/105,533, filed Feb. 3, 2023 Non-Final Office Action dated Oct. 16, 2025.
U.S. Appl. No. 18/120,863, filed Mar. 13, 2023 Restriction Requirement dated Nov. 7, 2025.
U.S. Appl. No. 18/653,641, filed May 2, 2024 Notice of Allowance dated Dec. 10, 2025.

* cited by examiner

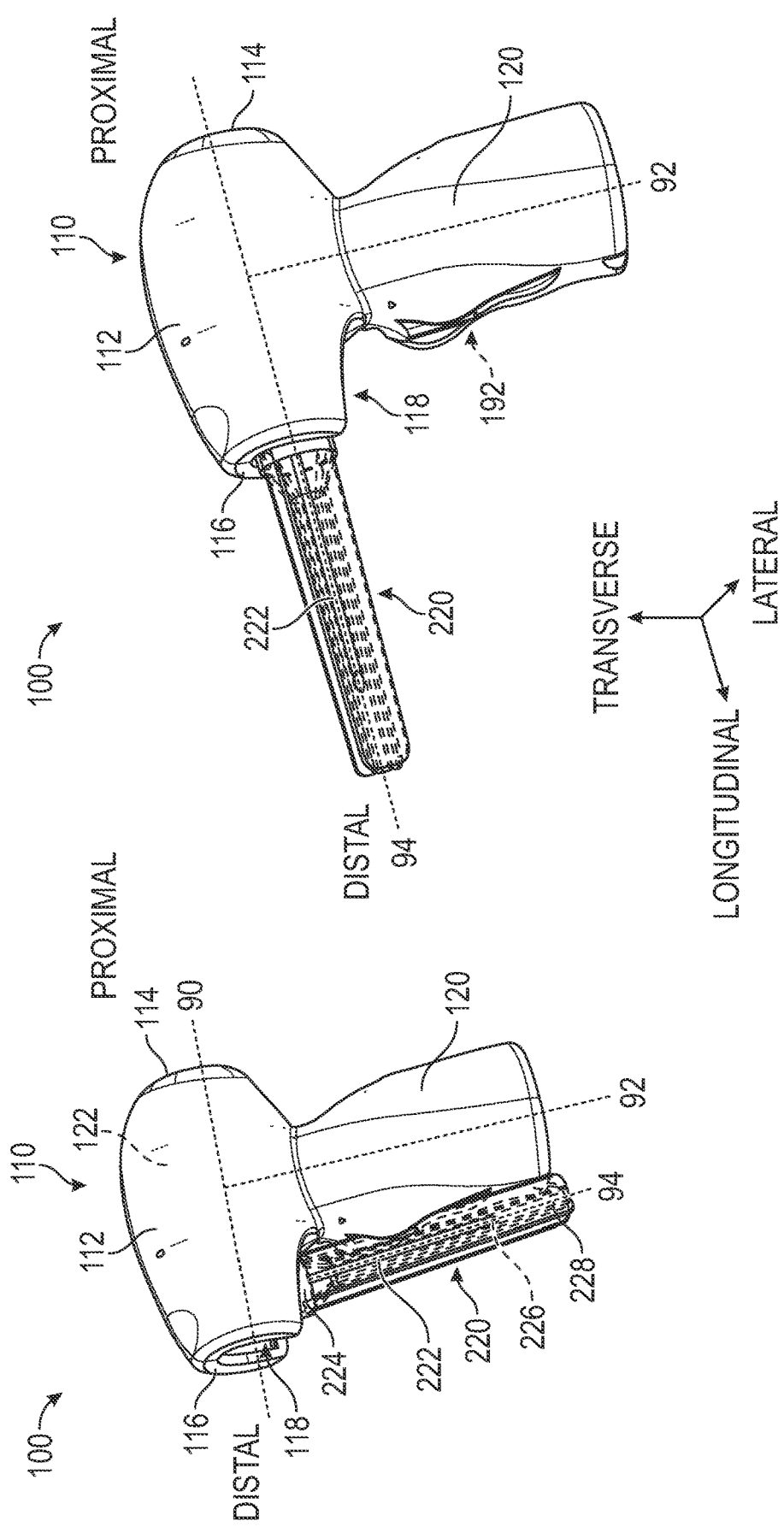

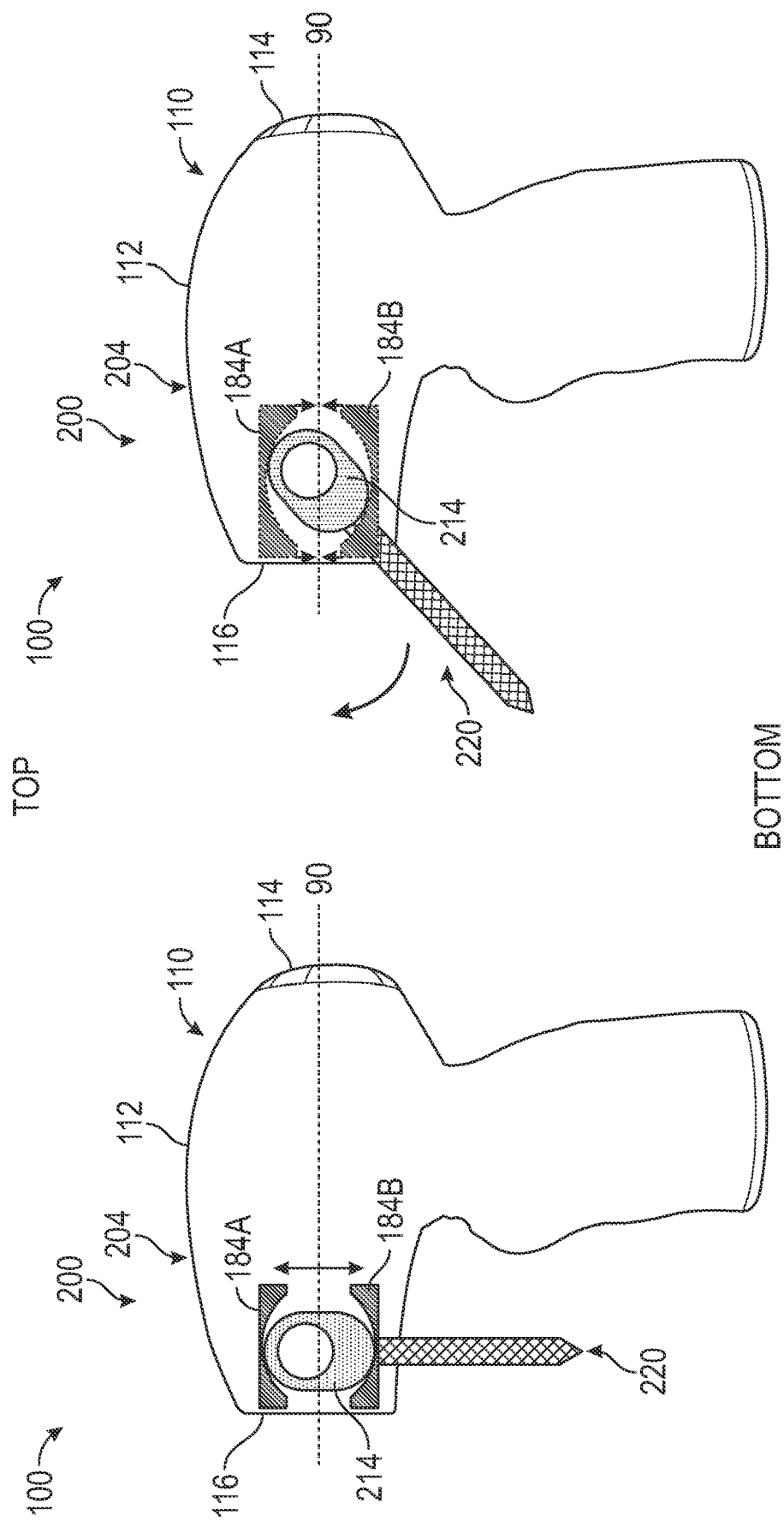

RETRACTABLE INTRAOSSEOUS ACCESS SYSTEM

PRIORITY

This application claims the benefit of priority to U.S. Patent Application No. 63/073,342, filed Sep. 1, 2020, which is incorporated by reference in its entirety into this application.

BACKGROUND

Intraosseous (IO) access systems are used in emergency situations when vascular access is required rapidly, and direct venous access is difficult or impossible to achieve. The intraosseous access system can include a driver configured to drill a needle through a cortex layer of a bone to access the medullary cavity. Fluids can then be delivered through the needle, into the medullary cavity, and into the vascular of the patient.

Current methods of placing the needle include providing a driver and a separately packaged access assembly that includes the needle. However, such IO access systems must also be assembled before use by removing the needle from its packaging, removing the drill from separate packaging, attaching the needle to the drill and removing the needle cap prior to starting the procedure. These multi-step assembly procedures can cost valuable time. Further, the separately packaged components can get lost or separated during transport or storage, and require additional logistics to ensure all the separate components are properly stocked and stored in a sterile environment.

It would beneficial therefore to provide an intraosseous access system that provides an "all-in-one" system, requiring fewer separate components to track and store, and require fewer assembly steps prior to use. Further the intraosseous access system can provide a compact profile to facilitate storage and transport, and reduce packaging costs. The compact design can be important since IO access systems can be used and stored by pre-hospital users that have limited space in kit bags or in ambulances. Similarly, IO access systems are also used in Emergency Room, Trauma Rooms, or Intensive Care Unit (ICU) situations, such as on crash carts, or the like, where space is limited. Disclosed herein are foldable, retractable intraosseous access systems and associated methods of use that address the foregoing.

SUMMARY

Disclosed herein is a foldable intraosseous access system for accessing a medullary cavity including, a driver including a housing extending along a longitudinal axis, an access assembly pivotably coupled to the driver between a folded state and an active state, the access assembly including a needle extending parallel to the longitudinal axis in the active state, and extending at an angle to the longitudinal axis in the folded state.

In some embodiments, the foldable intraosseous access system further includes a drive train configured to rotate the needle about the longitudinal axis in the active state and configured to disengage the access assembly in the folded state. In some embodiments, the needle in the folded state is angled between 50° and 180° relative to the longitudinal axis. In some embodiments, the foldable intraosseous access system further includes a grip extending from the housing along a grip axis extending at an angle relative to the longitudinal axis, the needle extending parallel to the grip axis in the folded state. In some embodiments, the grip includes a grip recess configured to receive a portion of the access assembly therein, in the folded state.

In some embodiments, the access assembly is further transitionable between a locked state and an unlocked state, the locked state preventing the access assembly from transitioning between the active state and the folded state. In some embodiments, the foldable intraosseous access system further includes a cap configured to enclose a portion of the needle and maintain the needle within a sterile environment or prevent accidental needle stick injuries. In some embodiments, the housing further includes a distal opening, the access assembly extending through the distal opening in both the folded state and the active state. In some embodiments, the drive train includes one of a gear mechanism, a drive spring, an electric motor, or a battery.

In some embodiments, the foldable intraosseous access system further includes a cam system, including a cam slidably engaged with a slot disposed in the housing in the active state. In some embodiments, the foldable intraosseous access system further includes a biasing member configured to urge the cam to engage the slot in the active state. In some embodiments, the foldable intraosseous access system further includes a coupler disposed on the access assembly and slidably engaged with a receiver coupled to the drive train, the coupler engaged with the receiver when the access assembly is in the active state. In some embodiments, the foldable intraosseous access system further includes a cradle mechanism including a first cradle and a second cradle slidably engaged relative to each other and configured to retain a cam therebetween in one or more resting states to maintain the access assembly in one of the folded state or the active state.

In some embodiments, the foldable intraosseous access system further includes a biasing member configured to bias the first cradle and the second cradle towards each other. In some embodiments, the foldable intraosseous access system further includes a socket mechanism including a socket having a socket recess disposed on a distal surface thereof, and configured to engage a surface of a cam to retain the cam one or more resting states and to maintain the access assembly in one of the folded state or the active state. In some embodiments, the foldable intraosseous access system further includes a biasing member configured to bias the socket towards the cam.

Also disclosed is a retractable intraosseous access system for accessing a medullary cavity including, a driver including a housing extending along a longitudinal axis, and an access assembly slidably engaged with the driver between a retracted state and an active state, the access assembly including a needle extending parallel to the longitudinal axis and disposed within the housing in the retracted state and extending from a distal opening of the housing in the active state.

In some embodiments, the access assembly is further transitionable between a locked state and an unlocked state, the locked state preventing the access assembly from transitioning between the active state and the retracted state. In some embodiments, the retractable intraosseous access system further includes a drive train configured to rotate the needle about the longitudinal axis in the active state and configured to disengage the access assembly in the folded state. In some embodiments, the drive train includes one of a gear mechanism, a drive spring, an electric motor, or a battery.

In some embodiments, the retractable intraosseous access system further includes a biasing member configured to bias the access assembly towards the active state. In some embodiments, the retractable intraosseous access system further includes a catch mechanism configured to releasably engage the access assembly and retain the access assembly in the retracted state.

Also disclosed is a method of accessing a medullary cavity including, providing an intraosseous access system including a housing extending along a longitudinal axis, and an access assembly coupled thereto and including a needle, pivoting the access assembly from a retracted state, where the needle extends at an angle relative to the longitudinal axis, to an active state, where the needle extends parallel to longitudinal axis, and activating a drive train to rotate the needle about the longitudinal axis.

In some embodiments, the drive train is configured to engage the access assembly in the active state and disengage the access assembly in the retracted state. In some embodiments, the method further includes pivoting the needle through an angle of between 50° and 180° relative to the longitudinal axis. In some embodiments, the method further includes pivoting the needle to extend parallel to an axis of a grip extending from the housing. In some embodiments, the method further includes disposing a portion of the access assembly within a grip recess disposed on the grip when the access assembly is in the retracted state.

In some embodiments, the method further includes transitioning the access assembly between a locked state and an unlocked state, the locked state preventing the access assembly from transitioning between the active state and the folded state. In some embodiments, the drive train includes one of a gear mechanism, a drive spring, an electric motor, or a battery. In some embodiments, the method further includes sliding a cam along a longitudinal axis to engage a slot disposed in the housing when the access assembly is in the active state.

Also disclosed is a method of accessing a medullary cavity including, providing an intraosseous access system including a housing extending along a longitudinal axis, and an access assembly slidably engaged therewith and including a needle, sliding the access assembly along the longitudinal axis from a retracted state, where the needle is disposed within the housing, to an active state, where the needle extends from a distal end of the housing, and activating a drive train to rotate the needle about the longitudinal axis.

In some embodiments, the drive train is configured to engage the access assembly in the active state and disengage the access assembly in the retracted state. In some embodiments, the method further includes transitioning the access assembly between a locked state and an unlocked state, the locked state preventing the access assembly from transitioning between the active state and the retracted state.

These and other features of the concepts provided herein will become more apparent to those of skill in the art in view of the accompanying drawings and following description, which describe particular embodiments of such concepts in greater detail.

DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which:

FIG. 1A illustrates a perspective view of a foldable intraosseous access system in a folded state, in accordance with some embodiments.

FIG. 1B illustrates a side view of a foldable intraosseous access system in an active state, in accordance with some embodiments.

FIGS. 2A-2C illustrate a schematic view of a foldable intraosseous access system including a cradle folding mechanism, in accordance with some embodiments.

DESCRIPTION

Figure 1C:
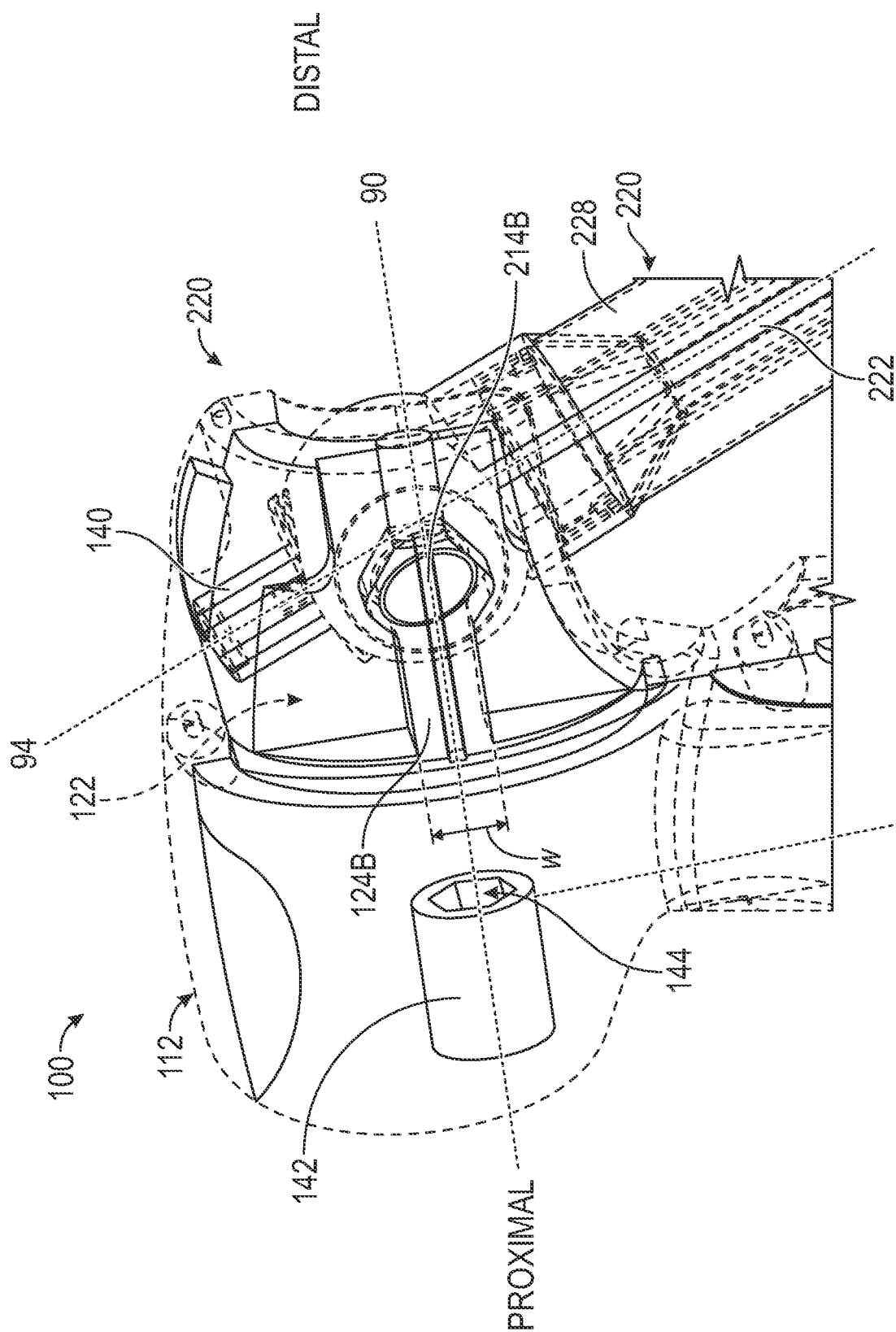
FIG. 1C illustrates close up detail of a folding mechanism of a foldable intraosseous access system, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

With respect to "proximal," a "proximal portion" or a "proximal-end portion" of, for example, a needle disclosed herein includes a portion of the needle intended to be near a clinician when the needle is used on a patient. Likewise, a "proximal length" of, for example, the needle includes a length of the needle intended to be near the clinician when the needle is used on the patient. A "proximal end" of, for example, the needle includes an end of the needle intended to be near the clinician when the needle is used on the patient. The proximal portion, the proximal-end portion, or the proximal length of the needle can include the proximal end of the needle; however, the proximal portion, the proximal-end portion, or the proximal length of the needle need not include the proximal end of the needle. That is, unless context suggests otherwise, the proximal portion, the proximal-end portion, or the proximal length of the needle is not a terminal portion or terminal length of the needle.

With respect to "distal," a "distal portion" or a "distal-end portion" of, for example, a needle disclosed herein includes a portion of the needle intended to be near or in a patient when the needle is used on the patient. Likewise, a "distal length" of, for example, the needle includes a length of the needle intended to be near or in the patient when the needle is used on the patient. A "distal end" of, for example, the needle includes an end of the needle intended to be near or in the patient when the needle is used on the patient. The distal portion, the distal-end portion, or the distal length of the needle can include the distal end of the needle; however, the distal portion, the distal-end portion, or the distal length of the needle need not include the distal end of the needle. That is, unless context suggests otherwise, the distal portion, the distal-end portion, or the distal length of the needle is not a terminal portion or terminal length of the needle.

To assist in the description of embodiments described herein, as shown in FIGS. 1A-1B, a longitudinal axis extends substantially parallel to an axial length of the needle of the device in an active state. A lateral axis extends normal to the longitudinal axis, and a transverse axis extends normal to both the longitudinal and lateral axes. As used herein, a horizontal plane extends along the lateral and longitudinal axes. A vertical plane extends normal to the horizontal plane.

Unless defined otherwise, all technical and scientific terms used herein have the same meaning as commonly understood by those of ordinary skill in the art.

FIGS. 1A-1F show various views of a foldable or retractable intraosseous (IO) access system ("system") 100. FIGS. 1A-1B show perspective views of the foldable or retractable intraosseous (IO) access system 100 in the retracted, or folded, state (FIG. 1A) and in an active state (FIG. 1B). In an embodiment, the system 100 can generally include a driver 110 and an access assembly 220. The driver 110 can include a housing 112 defining a substantially cylindrically shape extending longitudinally along a central longitudinal axis 90 between a distal end 116 and a proximal end 114, and can include a grip 120 extending therefrom. As will be appreciated, the housing 112 can define various three-dimensional shapes without departing from the spirit of the invention. In an embodiment, the grip 120 can extend from the housing 112 along an axis 92, extending substantially perpendicular to the central longitudinal axis 90. However, it will be appreciated that the axis 92 of the grip 120 can extend at other angles relative to the central longitudinal axis 90 without departing from the spirit of the invention. As will be appreciated various numbers and configurations of housing 112 and grip 120 are contemplated to fall within the scope of the present invention. The housing 112 can define an interior cavity 122 that communicates with an opening 118 disposed at the distal end 116 thereof.

The access assembly 220 can generally include a needle 222 supported by a needle hub 224, and defining a needle lumen 226. In an embodiment, the access assembly 220 can further include an obturator (not shown) configured to fit within the needle lumen 226 and prevent tissue and bone fragments from occluding the needle lumen 226 during a placement event. The access assembly 220 can further include a cap 228 configured to be placed over at least a portion of the needle 222. The cap 228 can maintain the needle 222 within a sterile environment during transport and storage and can prevent accidental needle stick injuries. In an embodiment, the access assembly 220, or portions thereof, can be rotatably coupled with the driver 110 and can rotate about a central longitudinal axis 90.

In an embodiment, the driver 110 can further include a drive train 108 configured to rotate the access assembly 220 and drill the needle 222 through the bone cortex to access the medullary cavity. Exemplary drive trains 108 can include electrical, mechanical, electro-mechanical, kinetic, potential mechanisms, springs, biasing members, gear mechanisms, electric motors and power sources (mains power supply, battery power supply, or the like), combinations thereof, and the like. The drive train 108 can be configured to provide rotational motion to the access assembly 220 about the central longitudinal axis 90. In an embodiment, the driver 110 can include an electric motor and battery pack, or a drive spring, configured to rotate the access assembly 220 and drill the needle 222 into the bone to access the medullary cavity.

In an embodiment, as shown in FIGS. 1A-1B, the access assembly 220 can be pivotably coupled to the driver 110 and can transition between a retracted position, or folded position (FIG. 1A), and an active position (FIG. 1B). In an embodiment, the access assembly 220 can pivot through a vertical plane defined by the longitudinal and transverse axes. However, it will be appreciated that the access assembly 220 can pivot through other planes in three dimensional space. In an embodiment, the access assembly 220 can pivot through an angle of between 1° and 360° relative to the central longitudinal axis 90. In an embodiment, the access assembly 220 can pivot through an angle of between 50° and 180° relative to the central longitudinal axis 90. In an embodiment, the access assembly 220 can pivot through an angle of substantially 90° relative to the central longitudinal axis 90.

In an embodiment, in the active position (FIG. 1B), an axis 94 of the access assembly 220 can extend parallel to a central longitudinal axis 90 of the driver 110. In an embodiment, in the active position (FIG. 1B), an axis 94 of the access assembly 220 can align with a central longitudinal axis 90 of the driver 110. In an embodiment, in the folded position (FIG. 1A), an axis 94 of the access assembly 220 can extend at an angle relative to the central longitudinal axis 90. In an embodiment, in the folded position (FIG. 1A), an axis 94 of the access assembly 220 can extend substantially parallel to an axis 92 of the grip 120. In an embodiment, in the folded position (FIG. 1A), an axis 94 of the access assembly 220 can extend at an angle of between 1° and 360° relative to the central longitudinal axis 90. In an embodiment, in the folded position (FIG. 1A), an axis 94 of the access assembly 220 can extend at an angle of between 5° and 180° relative to the central longitudinal axis 90. In an embodiment, in the folded position (FIG. 1A), an axis 94 of the access assembly 220 can extend at an angle of substantially 90° relative to the central longitudinal axis 90.

In an embodiment, the access assembly 220 can transition between one or more resting states between the folded state (FIG. 1A) and the active state (FIG. 1B). For example, the access assembly 220 can pivot through one or more resting states disposed at 5° or 10° increments between the folded state and the active state. It will be appreciated, however, that these increments are exemplary and greater or lesser degree increments are also contemplated.

In an embodiment, the grip 120 can include a recess 192 extending along a portion thereof and configured to receive a portion of the access assembly 220 therein, when the system 100 is in the folded state. Advantageously, the grip recess 192 can stabilize the access assembly 220 when the system 100 is in the folded state, during transport and storage. Further, the grip recess 192 can provide a more compact overall profile by receiving at least a portion of the access assembly 220 within a volume defined by the grip 120.

In an embodiment, as shown in FIG. 1C, the driver 110 can include a folding mechanism 200, disposed within the interior cavity 122 of the housing 112. The folding mechanism 200 can be configured to transition the access assembly 220 between the folded state and the active state, or between one or more resting states therebetween, or combinations thereof. In an embodiment, the folding mechanism 200 can be further configured to transition the access assembly 220 between locked state and an unlocked state, when the access assembly 220 is in one or more of the folded state, the active state, or one or more resting states therebetween. In the locked state, the folding mechanism 200 can prevent the access assembly 220 from transitioning from the current position, i.e. one of the folded state, the active state, or one or more resting states therebetween. In the unlocked state, the folding mechanism 200 can allow the access assembly 220 to transition between one or more of the folded state, the active state, or one or more resting states therebetween.

In an embodiment, the access assembly 220 can further include a coupler 140 disposed at a proximal end of the access assembly 220. The coupler 140 can be configured to selectively engage a receiver 142 that is coupled with the drive train 108. In an embodiment, the folding mechanism 200 in the unlocked position can disengage the coupler 140 from the receiver 142. In an embodiment, the folding mechanism 200 in the locked position can engage the coupler 140 with the receiver 142. In an embodiment, the folding mechanism 200 in the active and locked position can engage the coupler 140 with the receiver 142 and allow the drive train 108 to rotate the access assembly 220, or portions thereof. In an embodiment, the coupler 140 can define a substantially hexagonal cross-sectional shape, and can be configured to fit within a receiver recess 144 defining a similarly shaped, hexagonal cross-sectional shape. It will be appreciated, however, that other polygonal shaped coupler 140 and receiver recess 144, or "lock-and-key" type engagements, are also contemplated to fall within the scope of the present invention.

Advantageously, the folding mechanism 200 can be configured to only engage the coupler 140 with the receiver 142, when the access assembly 220 is in the active and locked state. This can prevent the drive train 108 from accidentally being activated and rotating the access assembly 220 prematurely, i.e. when the access assembly 220 is not positioned in the active state, i.e. during transport, storage, or assembly prior to use. In some embodiments, the drive train 108 of the driver 110 can be actuated by a pressure activated actuator such as a trigger, a button, or the like. In an embodiment, the drive train 108 can be activated by an axial pressure applied to the access assembly 220, or a portion thereof.

In an embodiment, the access assembly 220 can be selectively coupled with the folding mechanism 200 and allow a user to selectively attach, or selectively detach, the access assembly 220 therefrom. Advantageously, the selectively detachable access assembly 220 can allow a user to replace the access assembly 220 as desired either before or after a placement event in case of malfunction or misplacement of the needle 222. Further, a user can replace the access assembly 220 after use with a new access assembly and can transition the system 100 to the folded state ready for re-sterilization, storage, or reuse of the system 100.

FIGS. 1C-1F show further details of the folding mechanism 200. In an embodiment, a distal portion of the housing 112 can include a distal opening 118 communicating with an interior cavity 122 of the housing 112. The access assembly 220 can extend through the distal opening 118 to engage one or more of a folding mechanism 200 or a drive train 108 disposed within the housing 112. In an embodiment, the access assembly 220 can extend through the distal opening 118 in both the folded state and the active state.

In an embodiment, the folding mechanism 200 can include a cam system 202, having one or more cams 214 that are laterally offset from the central longitudinal axis 90. For example, a first cam 214A may be disposed on a left side and a second cam 214B may be disposed on a right side of the folding mechanism 200. The cam 214 can define a regular or irregular, substantially oval, or elliptical shape and can include one or more facets. The cam 214 may be configured to slidably engage a slot 124 disposed in a side wall of the interior cavity 122, and extending longitudinally. For example, a first cam 214A can slidably engage a first slot 124A, and a second cam 214B can slidably engage a second slot 124B. In an embodiment, the slot 124 can define a width (w) extending substantially perpendicular to the central longitudinal axis 90.

In an embodiment, the cam 214 can include a first diameter (d1) and a second diameter (d2) extending perpendicular thereto. The first diameter (d1) can be greater than the second diameter (d2). In an embodiment, the first diameter (d1) can be larger the width (w) of the slot 124, and the second diameter (d2) can be less than the width (w) of the slot 124. In an embodiment, the first diameter (d1) can be aligned parallel with an axis 94 of the access assembly 220.

Figure 1D:
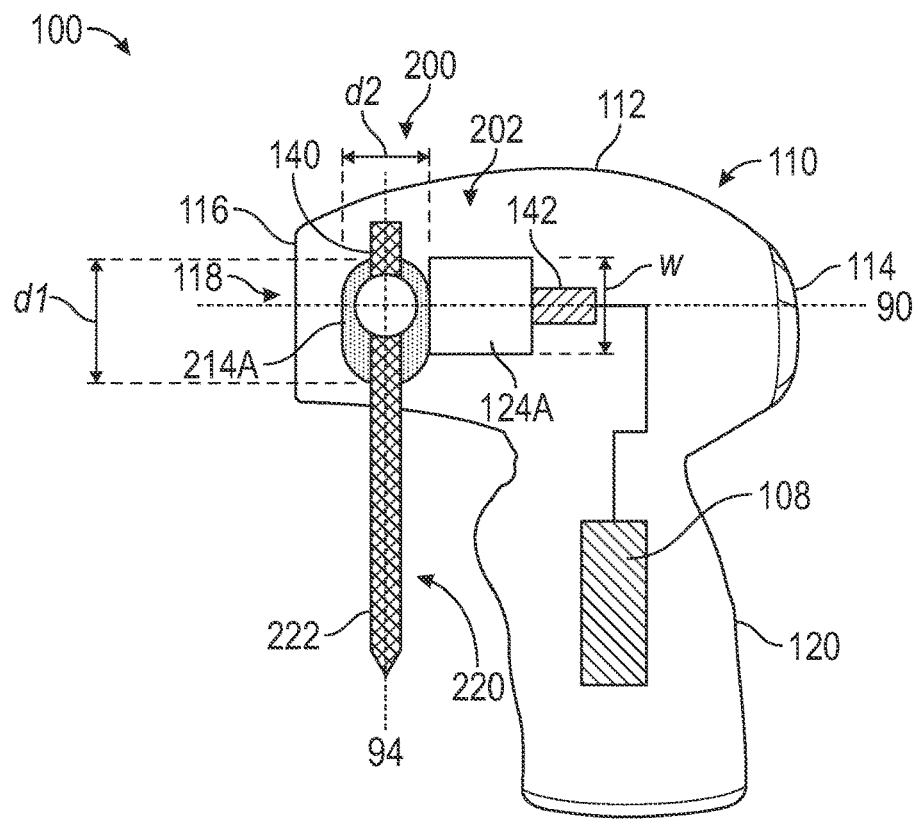
FIG. 1D illustrates a schematic view of a foldable intraosseous access system in a folded state, in accordance with some embodiments.
Figure 1E:
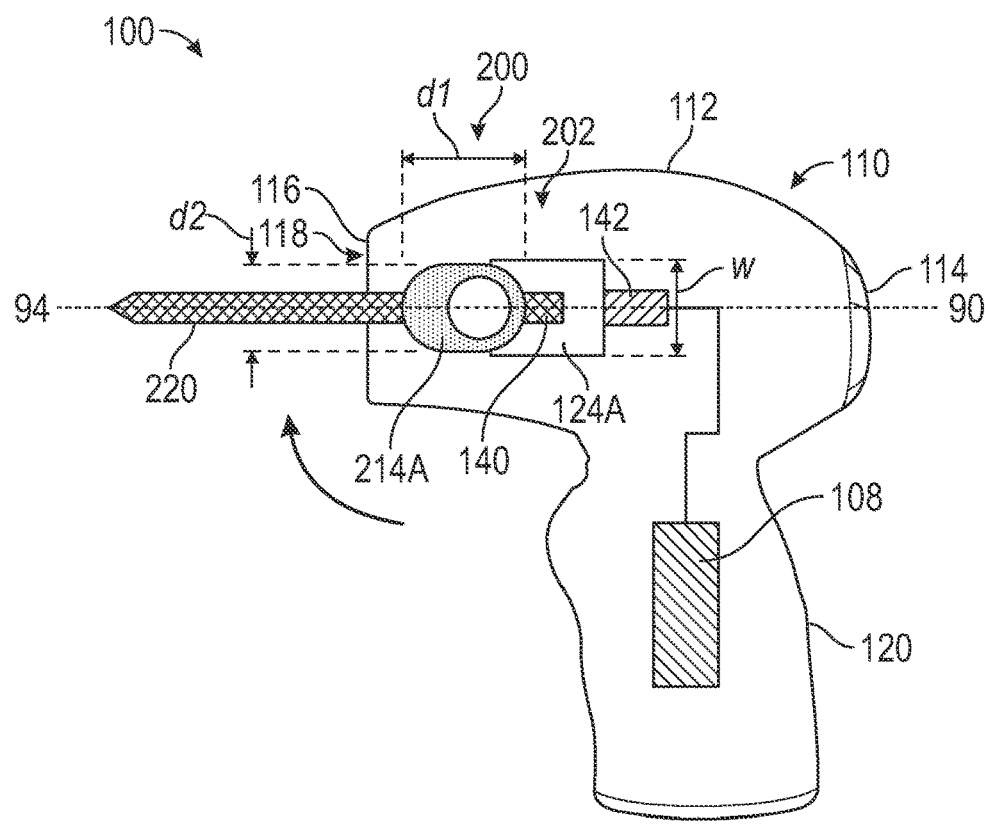
FIG. 1E illustrates a schematic view of a foldable intraosseous access system in an active unlocked state, in accordance with some embodiments.
Figure 1F:
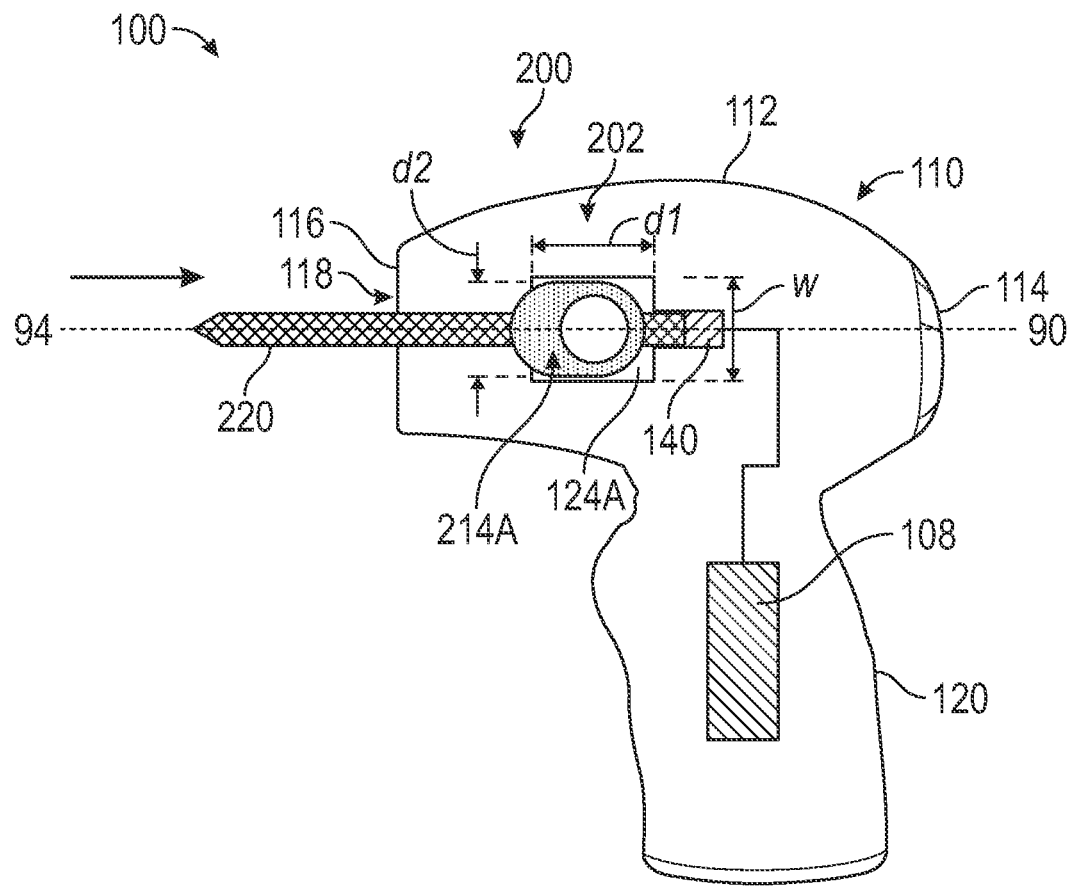
FIG. 1F illustrates a schematic view of a foldable intraosseous access system in an active locked state, in accordance with some embodiments.

As shown in FIG. 1D, in the folded state the first diameter (d1) of the cam 214 can be angled relative to a longitudinal axis of the slot 124, substantially parallel to the central longitudinal axis 90. As the access assembly 220 is transitioned to the active state (FIG. 1E), the axis 94 of the access assembly 220 can align parallel with the central longitudinal axis 90. As such the first diameter (d1) of the cam 214 can extend parallel to the axis of the slot 124 and the second diameter (d2) of the cam 214 can extend perpendicular thereto. In the active state, the cam 214 can be received within the slot 124 and can stabilize the access assembly 220 in the active state. The cam 214 can then slide between an active state unlocked position (FIG. 1E) and an active state locked position (FIG. 1F). In the active state locked position (FIG. 1F), the coupler 140 can engage the receiver 142 of the drive train 108.

In an embodiment, the folding mechanism 200 can further include a biasing member configured to bias the access assembly 220 towards the locked state. In use, a user can grasp the access assembly 220 and transition the access assembly 220 from the folded state to the unlocked active state. The biasing member can then transition the access assembly 220 from the unlocked active state to the locked active state by urging the cams 214 longitudinally into the slots 124. Similarly, to transition the access assembly 220 from the active, locked state to the retracted, folded state, a user can urge the access assembly 220 longitudinally distally to disengage the cam 214 from the slot 124 before pivoting the access assembly 220 to the folded state.

In an embodiment, the folding mechanism 200 can further include a second biasing member configured to bias the access assembly 220 towards the active state. A trigger mechanism can be configured to retain the access assembly 220 in the folded state. In use, a user can activate the trigger mechanism to release the access assembly 220 and allow the second biasing member to transition the access assembly 220 from the folded state to the active state. In an embodiment, the first biasing member can then transition the access assembly 220 from the unlocked state the locked state, as described herein. In an embodiment, a user can manually urge the access assembly 220 between one or more of the folded state, active state, unlocked state, or locked state, or combinations thereof. Advantageously, the foldable IO access system 100 may be configured to be packaged fully assembled with the access assembly 220 coupled to the driver 110. The system 10 can be stored in the storage state, and quickly transitioned to the active state ready for use. Advantageously, the access assembly 220 can be transitioned from the storage state to the active state and locked in the active state, ready for use. This can prevent premature disengagement of the access assembly 220 during usage.

Figure 2C:
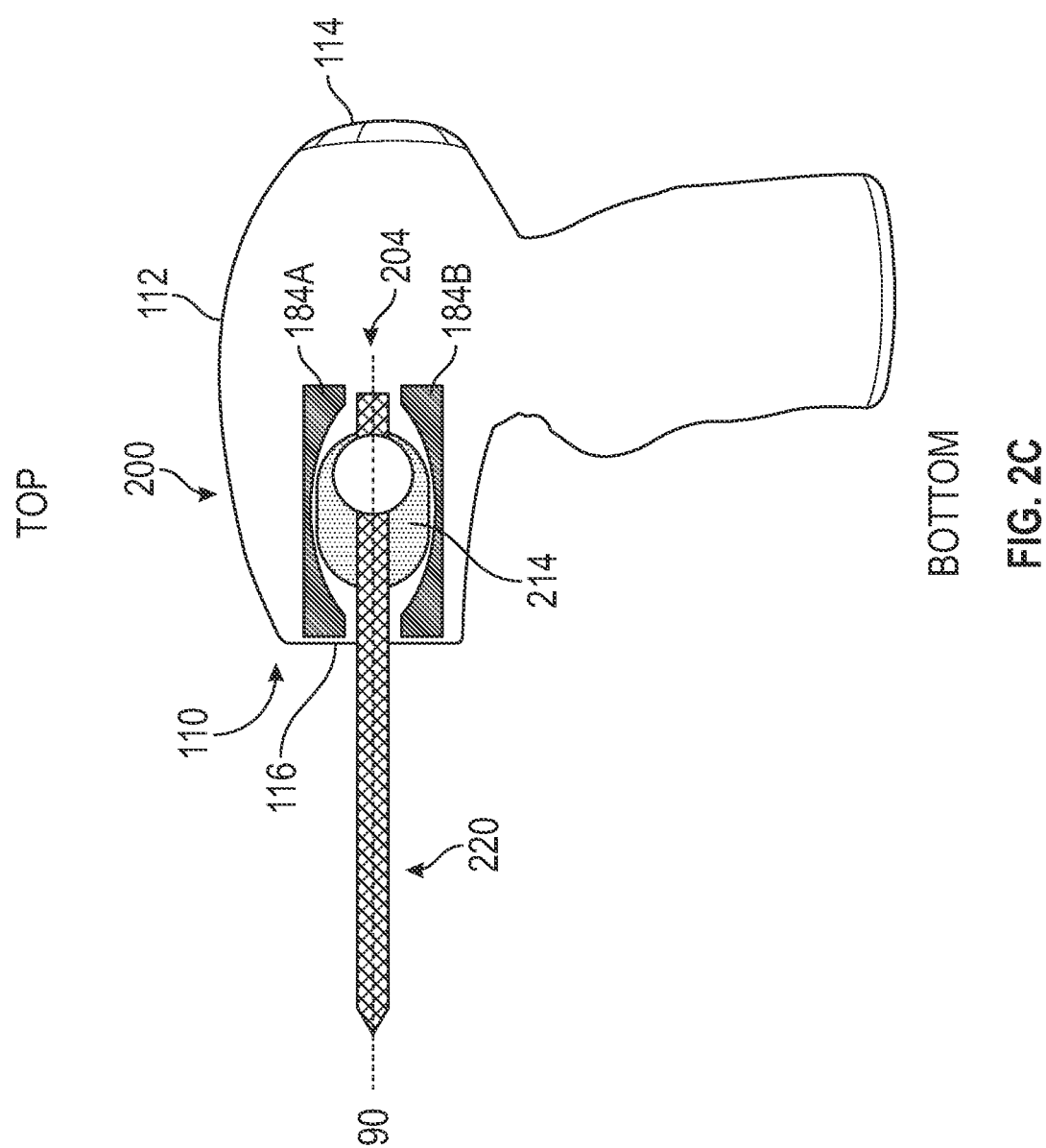

In an embodiment, as shown in FIGS. 2A-2C, the folding mechanism 200 can include a cradle mechanism 204. The cradle mechanism 204 can include a top cradle 184A and a bottom cradle 184B configured to retain a cam 214 therebetween. As shown, the top cradle 184A and the bottom cradle 184B can be arranged along a transverse axis with the cam 214 disposed therebetween. However, it will be appreciated that other configurations of cradle mechanism 204, extending along other axes or at angles relative thereto, are also contemplated to fall within the scope of the present invention.

The top cradle 184A and the bottom cradle 184B can be slidable along the transverse axis between a first position (FIG. 2A) and a second position (FIG. 2C). In the first position the top cradle 184A and the bottom cradle 184B are disposed radially outwards relative to the central longitudinal axis 90. In the second position (FIG. 2C) the top cradle 184A and the bottom cradle 184B are disposed radially inwards relative to the central longitudinal axis 90. The cradle mechanism 204 can further include a biasing member configured to bias the top cradle 184A and the bottom cradle 184B towards the second position (FIG. 2C).

In use, the access assembly 220 can transition between one or more of the folded state, the active state, or one or more resting states therebetween. The cradle mechanism 204 can retain the cam 214 between the top cradle 184A and the bottom cradle 184B. A facet of the cam 214 can engage a surface of the top cradle 184A or the bottom cradle 184B and can maintain the access assembly 220 one or more of the folded state (FIG. 2A), the active state (FIG. 2C), or one or more resting states therebetween (FIG. 2B), or combinations thereof. Advantageously, the cradle mechanism 204 can transition the access assembly 220 from the folded state directly to the locked active state expediting deployment of the IO access system 100.

Figure 2D:
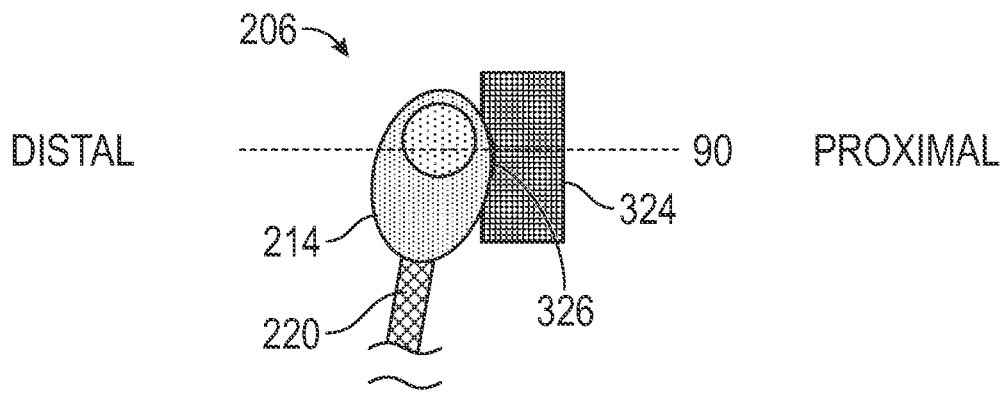
FIGS. 2D-2F illustrate a socket folding mechanism of a foldable intraosseous access system, in accordance with some embodiments.
Figure 2E:
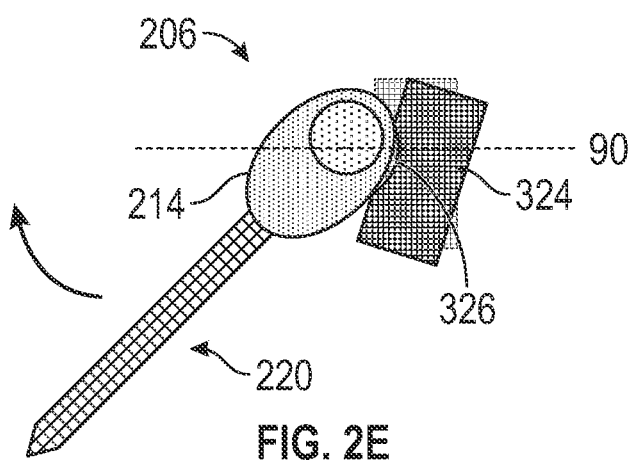
Figure 2F:
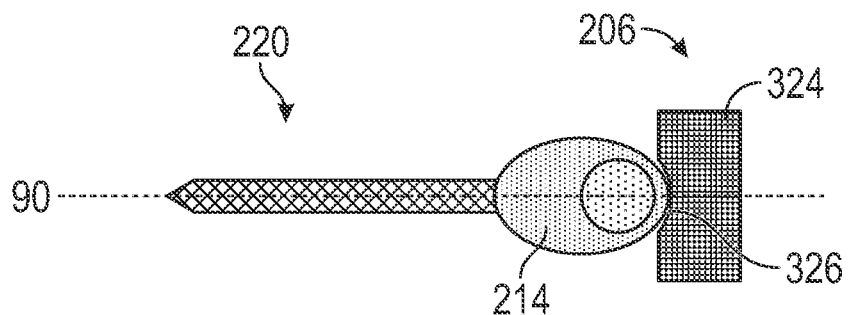

In an embodiment, as shown in FIGS. 2D-2F, the folding mechanism 200 can include a socket folding mechanism 206. The socket folding mechanism 206 can include a socket 324 disposed proximally of the cam 214 and include a recess 326 disposed on a distal surface thereof. The recess 326 can be configured to receive a portion of the cam 214 therein and stabilize the cam 214 in one or more of the folded state, the active state, or one or more resting states therebetween. In an embodiment, a facet of the cam 214 can engage the recess 326 to retain the cam 214 and access assembly 220, coupled thereto, in one or more of the folded state, the active state, or one or more resting states therebetween. In an embodiment, the socket 324 can include a biasing member configured to bias the socket 324 towards the cam 214.

In use, the socket 324 can stabilize the cam 214 in the folded state (FIG. 2D). A user can grasp the access assembly 220 and urge the access assembly 220 towards the active state. The cam 214 can engage the socket 324 and the socket can deflect (FIG. 2E) to allow the cam 214 to transition from the folded state to the active state (FIG. 2F), or to one or more resting states therebetween. In an embodiment, in the active position, the cam 214 can include a notch or protrusion configured engage and retain the cam 214 within the recess 236 and configured to prevent the cam 214 from disengaging the recess 236. As such, the cam 214 can be locked in the active position.

Figures 3A, 3B:
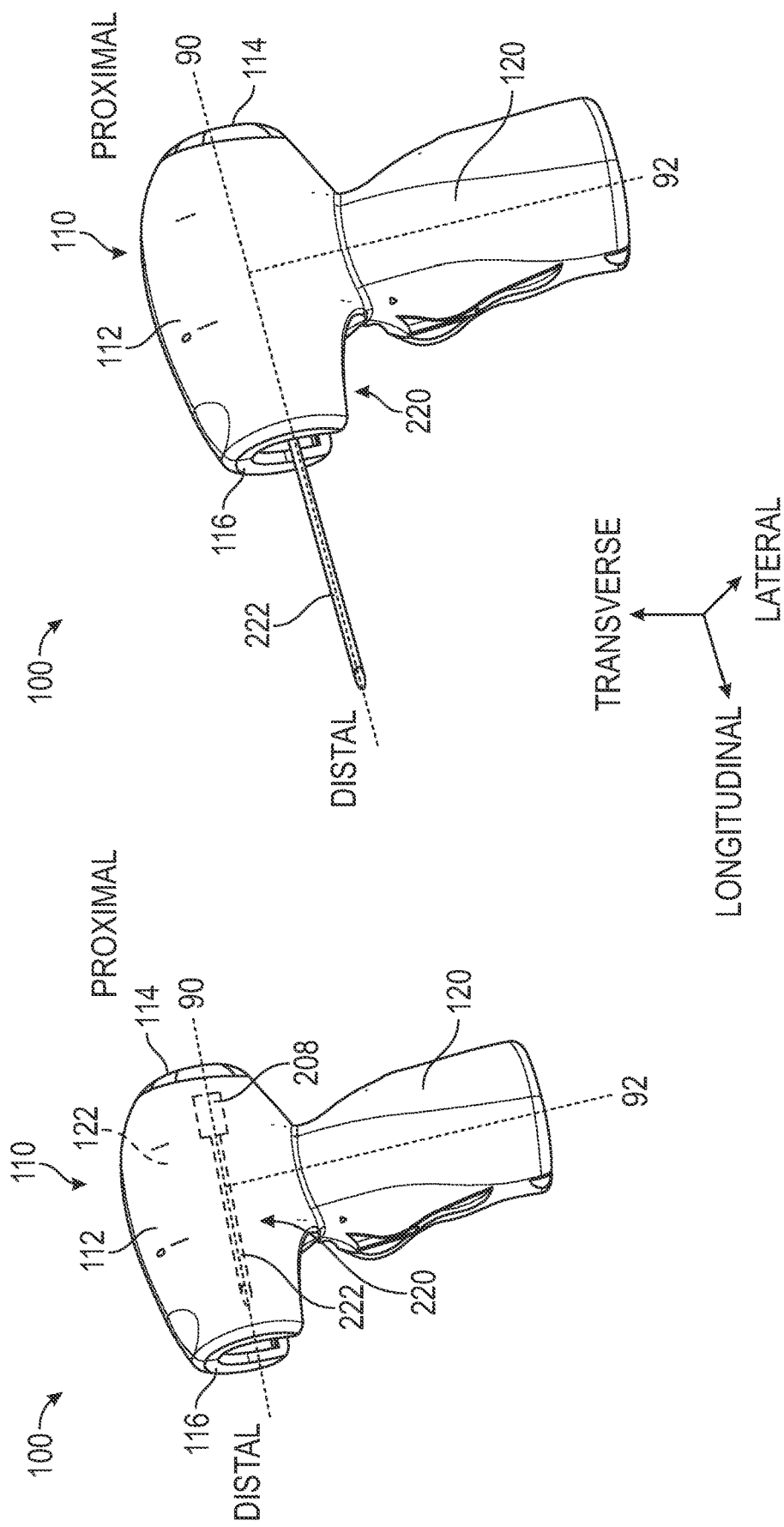
FIG. 3A illustrates a perspective view of a slidable intraosseous access system in a retracted state, in accordance with some embodiments.
FIG. 3B illustrates a perspective view of a slidable intraosseous access system in an active state, in accordance with some embodiments.

In an embodiment, as shown in FIGS. 3A-3B, the system 100 can include a sliding mechanism 208 configured to slide the needle assembly 220 or portions thereof, between a folded state (FIG. 3A) and an extended state (FIG. 3B). As shown in FIG. 3A, the access assembly 220, or portions thereof, can be retained within the housing 112, and can supported by the sliding mechanism 208. The sliding mechanism can be slidably engaged with the housing 112 along a central longitudinal axis 90 between the folded state and the active state. For example, a cam 214 extending laterally from the sliding mechanism can slidably engage a slot 124 extending longitudinally and disposed in a side wall of an interior cavity 122 of the housing 112. However, it will be appreciated that other configurations of sliding mechanism 208 are contemplated. In the folded state, the access assembly 220 can be retained within the housing 112. Advantageously, the housing 112 can maintain the access assembly 220 within a sterile environment during transport and storage. Further, the housing 112 can prevent accidental needle stick injuries.

In an embodiment, the system 100 can include a biasing member, configured to bias the sliding mechanism 208 and access assembly 220 towards the active state. In an embodiment, the system 100 can include a catch mechanism configured to retain the sliding mechanism 208 in the folded state. In use, a user can actuate the catch mechanism to release the access assembly 220. The biasing member can then transition the access assembly 220 towards the active state. In the active state, the user can then actuate the drive train 108 to rotate the access assembly 220 and drill the needle 22 into the bone, as described herein. Advantageously, the sliding mechanism 208 can allow for rapid deployment of the access assembly 220 by transitioning the access assembly 220 directly from the folded state to a locked active state. Further, the sliding mechanism 208 does not require a cap 228 since the access assembly 220 is stored within the housing 112. As such, in use a user does not have to perform a step of removing a cap 228 or similar shield from the needle 222, further expediting the deployment of the system 100.

In an embodiment, the access assembly 220 can be releasably attached to the sliding mechanism 208. Advantageously, after use, the access assembly 220, or portions thereof, can be detached from sliding mechanism 208 and disposed of Optionally a second access assembly can be coupled to the sliding mechanism 208. In an embodiment, the sliding mechanism 208 can then be transitioned from the active state to the folded state and stored ready for reuse.

Advantageously, embodiments of the IO access system 100 can provide a reduced, more compact overall profile when in a stored, folded, or folded state. As such, the system 100 require less room during storage and transport. Further, the system 100 can be provided with the access assembly 220 already coupled to the driver 110 as an "all-in-one" device reducing the number of separate components to track, unpackage and assembly, reducing the time required for assembly, reducing packaging, and reducing associated costs and complexity.

Figure 4:
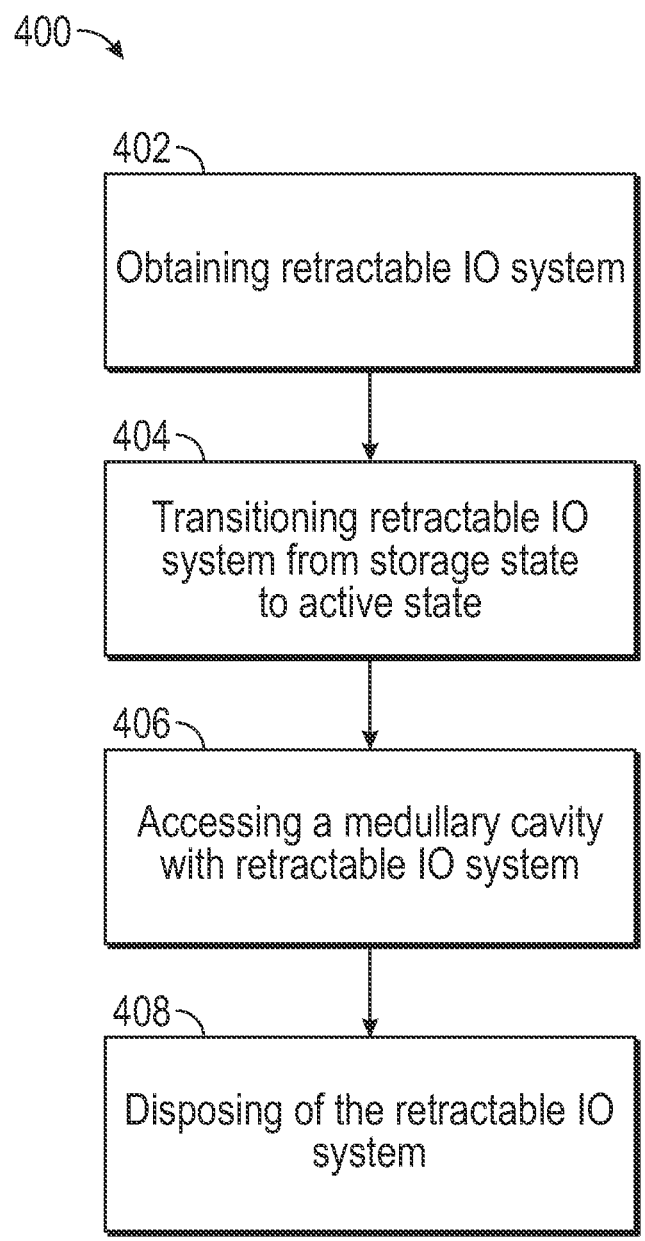
FIG. 4 illustrates a flow chart of an exemplary method of use for a retractable or foldable IO access system, in accordance with some embodiments.

FIG. 4 illustrates a block diagram of a method 400 of accessing a medullary cavity using embodiments of a foldable IO access system 100 disclosed herein. The method 400 includes obtaining an IO access system 100, as described herein (block 402). In some embodiments, the obtaining a foldable IO access system includes the system 100 being in a single use packaging wherein the system 100 is fully assembled and includes, for example, the folding mechanism 200 configured in the storage state. In the storage state, the system 100 can be configured to prevent premature deployment of the access assembly 220 and/or activation of the drive train 108 of the driver 110.

The method 400 further includes transitioning the system 100 from the storage, folded, or folded state to the active state (block 404). The method 400 includes accessing the medullary cavity using the IO access system 100 (block 406). The method 400 further includes disposing of the IO access system 100 (block 408). In some embodiments, disposing of the IO access system 100 includes disengaging the access assembly 220 from the driver 110 and disposing of the access assembly 220. In some embodiments disposing of the IO access system 100 includes releasably attaching a second access assembly, and transitioning the system 100 from the active state to the storage, folded, or folded state and storing for reuse.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A foldable intraosseous access system for accessing a medullary cavity, comprising:
a driver including a housing extending along a longitudinal axis, and a grip extending along a grip axis angled relative to the longitudinal axis, the housing including a drive train; and
a single access assembly pivotably coupled to the housing between a folded state and an active state, the single access assembly including a needle defining a lumen and extending parallel to the longitudinal axis in the active state, and extending at an angle to the longitudinal axis in the folded state, the single access assembly further including an obturator disposed within the lumen of the needle, the drive train configured to provide rotational motion to the single access assembly in the active state to drill the needle of the single access assembly through a bone cortex.

2. The foldable intraosseous access system according to claim 1, wherein the drive train is configured to rotate the needle about the longitudinal axis in the active state and configured to disengage the single access assembly in the folded state.

3. The foldable intraosseous access system according to claim 2, wherein the drive train includes one of a gear mechanism, a drive spring, an electric motor, or a battery.

4. The foldable intraosseous access system according to claim 2, further including a coupler disposed on the single access assembly and slidably engaged with a receiver coupled to the drive train, the coupler engaged with the receiver when the single access assembly is in the active state.

5. The foldable intraosseous access system according to claim 1, wherein the needle in the folded state is angled between 50° and 180° relative to the longitudinal axis.

6. The foldable intraosseous access system according to claim 1, wherein the needle extends parallel to the grip axis in the folded state.

7. The foldable intraosseous access system according to claim 1, wherein the grip includes a grip recess configured to receive a portion of the single access assembly therein, in the folded state.

8. The foldable intraosseous access system according to claim 1, wherein the single access assembly is further transitionable between a locked state and an unlocked state, the locked state preventing the single access assembly from transitioning between the active state and the folded state.

9. The foldable intraosseous access system according to claim 1, further including a cap configured to enclose a portion of the needle and maintain the needle within a sterile environment or prevent accidental needle stick injuries.

10. The foldable intraosseous access system according to claim 1, wherein the housing further includes a distal opening, the single access assembly extending through the distal opening in both the folded state and the active state.

11. The foldable intraosseous access system according to claim 1, further including a cam system including a cam coupled to the single access assembly and defining a first diameter extending along a first axis, and a second diameter extending along a second axis, perpendicular to the first axis, the second diameter being less than the first diameter, the cam system also including a slot disposed in the housing and defining a width that is less than the first diameter and greater than the second diameter, the cam slidably engaged with the slot when the single access assembly is in the active state.

12. The foldable intraosseous access system according to claim 11, further including a biasing member configured to urge the cam to engage the slot when the single access assembly is in the active state.

13. The foldable intraosseous access system according to claim 11, wherein the single access assembly is configured to transition from the active state to the folded state by the cam disengaging the slot before rotating the single access assembly through an arc extending perpendicular to the longitudinal axis.

14. The foldable intraosseous access system according to claim 1, wherein the single access assembly pivots through an arc extending over a vertical plane, between the folded state and the active state.

* * * * *